United States Patent
Sjölund et al.

(10) Patent No.: US 11,202,172 B2
(45) Date of Patent: Dec. 14, 2021

(54) SYSTEM AND METHOD FOR MANAGING INDOOR POSITIONING DATA

(71) Applicant: STRATACACHE LIMITED, Dublin (IE)

(72) Inventors: Björn Sjölund, Turku (FI); Niclas Jern, Turku (FI); Gabriel Nyman, Mariehamn (FI)

(73) Assignee: STRATACACHE LIMITED, Dublin (IE)

( * ) Notice: Subject to any disclaimer, the term of this patent is extended or adjusted under 35 U.S.C. 154(b) by 231 days.

(21) Appl. No.: 14/926,942

(22) Filed: Oct. 29, 2015

(65) Prior Publication Data

US 2017/0127241 A1    May 4, 2017

(51) Int. Cl.
| | |
|---|---|
| *H04W 4/029* | (2018.01) |
| *H04W 4/33* | (2018.01) |
| *G01S 5/02* | (2010.01) |
| *H04W 84/02* | (2009.01) |
| *G01S 5/16* | (2006.01) |

(52) U.S. Cl.
CPC .......... *H04W 4/029* (2018.02); *G01S 5/0221* (2013.01); *G01S 5/02524* (2020.05); *G01S 5/16* (2013.01); *H04W 4/33* (2018.02); *H04W 84/02* (2013.01)

(58) Field of Classification Search
CPC ......... H04W 4/04; H04W 4/029; H04W 4/33; G01S 5/0221; G01S 5/16
See application file for complete search history.

(56) References Cited

U.S. PATENT DOCUMENTS

| | | | |
|---|---|---|---|
| 2009/0201850 A1 | 8/2009 | Davis et al. | |
| 2014/0113560 A1* | 4/2014 | Graube | H04B 7/26 455/41.2 |
| 2014/0209681 A1* | 7/2014 | Chen | G06Q 30/02 235/440 |
| 2014/0335893 A1* | 11/2014 | Ronen | G01S 5/0252 455/456.1 |
| 2015/0327082 A1* | 11/2015 | Kadel | H04W 24/02 455/449 |
| 2015/0350850 A1* | 12/2015 | Edge | G01S 5/0018 455/456.1 |
| 2016/0150359 A1* | 5/2016 | Shaw | H04W 4/33 455/456.1 |
| 2017/0041744 A1* | 2/2017 | McKay | H04W 4/021 |
| 2017/0055117 A1* | 2/2017 | Archer | H04W 64/006 |

* cited by examiner

*Primary Examiner* — Donald H B Braswell
(74) *Attorney, Agent, or Firm* — Dickinson Wright PLLC

(57) ABSTRACT

Disclosed is a system for managing indoor positioning data of a site having a plurality of zones. The system comprises a plurality of sensors, forming at least one sensor network, operable to collect positioning data of the at least one communication device visiting the site and the plurality of sensors. The at least one sensor network comprises an exit point for forwarding the collected positioning data based on at least a pre-determined time and a status of the least one communication device. The system also comprises a processing unit having a positioning module for determining spatial position of the at least one communication device, a site-map module for calibrating installation positions for the plurality of sensors, a network configuration module for configuring the at least one sensor network to collect and forward the positioning data, and an analytics module for determining aggregated analytics data based on the determined spatial position.

36 Claims, 8 Drawing Sheets

SYSTEM AND METHOD FOR MANAGING INDOOR POSITIONING DATA

TECHNICAL FIELD

The present disclosure relates generally to managing indoor positioning data; and more specifically, to a system and a method for managing indoor positioning data of a site to provide targeted advertising in the site.

BACKGROUND

Conventionally, systems for measuring one or more spatial positions of one or more corresponding wireless communication devices, for example smart phones, within a given region are known. One such example includes targeted advertising for promoting sale of any product (or services) in a site, such as a shopping mall or a shopping center. Specifically, the targeted advertising includes digitally presenting advertisement to shoppers, based on the shopping behavior of the shoppers present in the shopping complex. For example, during targeted advertising when, where and what advertisement content to be presented is analyzed and presented in the shopping complex such that consumer's response towards advertised product increases.

Typically, in the process of targeted advertising shoppers movement is tracked, for example with the help of cameras, beam breakers and wireless sensors. The cameras, beam breakers are good at detecting the volume of shoppers visiting a site as well as popular paths followed by the shoppers. However, the wireless sensors are able to track movement of the shoppers inside the site with a known unique identifier, for example, an identification of a communication device carried by the shoppers. The communication device may include Wi-Fi enabled device or a Bluetooth enabled device generally carried by the shoppers while visiting the site. Therefore, the identification of a communication device may be a Media Access Control (MAC) address of the communication device. The targeted advertising also includes analysis of true performance of the targeted advertising by associating movement data of the shoppers with the point of sales data.

However, the targeted advertising process, particularly, indoor positioning data managing systems (or method) suffer from various problems. Specifically, a primary problem may be associated with analyzing positioning data (of the shoppers, for example, positioning data of the communication devices carried by the shoppers) collected from the wireless sensors in the site. For example, the analysis of the positioning data of the communication devices may be subjected to issues, such as scalability problem, near to real-time problem, reliability and cost efficiency.

In an example site, when number of wireless sensors grows linearly, the number of observations (positioning data collected by the communication devices) also grows linearly. Also, a large number of sensors for a given site correspond to reliability and accuracy of positioning data collected therewith. In an example, a Wi-Fi based sensor system of a shopping mall may include hundreds of sensors, and each communication device in the mall transmits a "ping" (radio packet) every 30 seconds. Further, each radio packet is collected by about an average of four sensors (to identify a spatial position of a communication device). Therefore, the mall having 1000 visitors results in about 8000 observations per minute, which need to be analyzed/processed to identify the spatial positions of the shoppers in a reliable way. Furthermore, the shoppers may be categorized and the different categories may need different processing. For example, there may be shoppers, who have for example opted-in for a loyalty program of the mall (i.e. targeted advertising program), thus spatial position of such shoppers should be known in order to provide such shoppers with specific information in a specific place at a specific time. An example of this kind of information is targeted advertising tailored for a person and the advertising being bound to a location, such as digital signage. Therefore, a mall, where about 1000 shoppers yield about 8000 positioning data, needs collection and processing of such huge amount of positioning data to identify the spatial positions of the shoppers in a real time, such as in few seconds.

Further, the determination of the spatial position of the shoppers should be reliable. For example, in situations where some sensors are disconnected (by accident) from power supply, or sensors are replaced with new ones with different characteristics, or simply new sensors are installed. In such instance, positioning data from such sensors should also be collected for identifying reliable spatial positions. For example, auto-configuration and calibration of the sensor network (providing positioning data) should be possible for identifying reliable spatial positions. Furthermore, the scalability problem, i.e. addition of large number sensors in a site should be dealt efficiently. Moreover, the analysis of the positioning data should be flexible in terms of privacy. For example, in a Wi-Fi based tracking arrangement, shoppers must have the ability to opt-out from such tracking, and on the other hand there, should be an opt-in mechanism, for example, for those shoppers participating in some loyalty program and thus allowing greater freedom in tracking and provisioning of various offers and advertising to such shoppers.

Therefore, in light of the foregoing discussion, there exists a need to overcome the aforementioned drawbacks of conventional indoor positioning data managing systems and methods, for example, for providing targeted advertising.

SUMMARY

The present disclosure seeks to provide a system for managing indoor positioning data of a site having a plurality of zones.

The present disclosure also seeks to provide a method for managing indoor positioning data of a site having a plurality of zones.

In one aspect, an embodiment of the present disclosure provides a system for managing indoor positioning data of a site having a plurality of zones, the system comprises a plurality of sensors arranged in the plurality of zones for forming at least one sensor network, the at least one sensor network is operable to collect positioning data of the at least one communication device present at the site and the plurality of sensors, wherein the at least one sensor network comprises an exit point for forwarding the collected positioning data based on at least a pre-determined time and a status of the least one communication device; and a processing unit for receiving the forwarded positioning data from the at least one sensor network, the processing unit comprising a positioning module for determining spatial position of the at least one communication device based on the positioning data of the at least one communication device and the plurality of sensors, a site-map module for providing floor-map information of the site, the site-map module is associated with the positioning module for calibrating installation positions for the plurality of sensors with respect to the plurality of zones, a network configuration module for configuring the at least one sensor network to collect and forward the positioning data, the network configuration module is associated with the positioning module and the site-map module for identifying sensors that define the at least one sensor network, and an analytics module for determining aggregated analytics data based on the determined spatial position of the at least one communication device.

In another aspect, an embodiment of the present disclosure provides a method for managing indoor positioning data of a site having a plurality of zones, the method comprises collecting positioning data of at least one communication device present at the site and a plurality of sensors arranged in the plurality of zones forming at least one sensor network;

forwarding the collected positioning data, by an exit point of the at least one sensor network, based on at least a pre-determined time and a status of the least one communication device;

receiving the forwarded positioning data by a processing unit for processing the forwarded positioning data, wherein the processing unit is operable to determine spatial position of the at least one communication device, by a positioning module of the processing unit, based on the positioning data of the at least one communication device and the plurality of sensors, provide floor-map information of the site, by a site-map module of the processing unit, the site-map module is associated with the positioning module for calibrating installation positions for the plurality of sensors with respect to the plurality of zones, configure the at least one sensor network, by a network configuration module of the processing unit, to collect and forward the positioning data, the network configuration module is associated with the positioning module and the site-map module for identifying sensors that define the at least one sensor network, and determine aggregated analytics data, by an analytics module of the processing unit, based on the determined spatial position of the at least one communication device.

Embodiments of the present disclosure substantially eliminate or at least partially address the aforementioned problems in the prior art, and enables managing indoor positioning data in a reliable, a real-time, a scalable and a cost-efficient manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
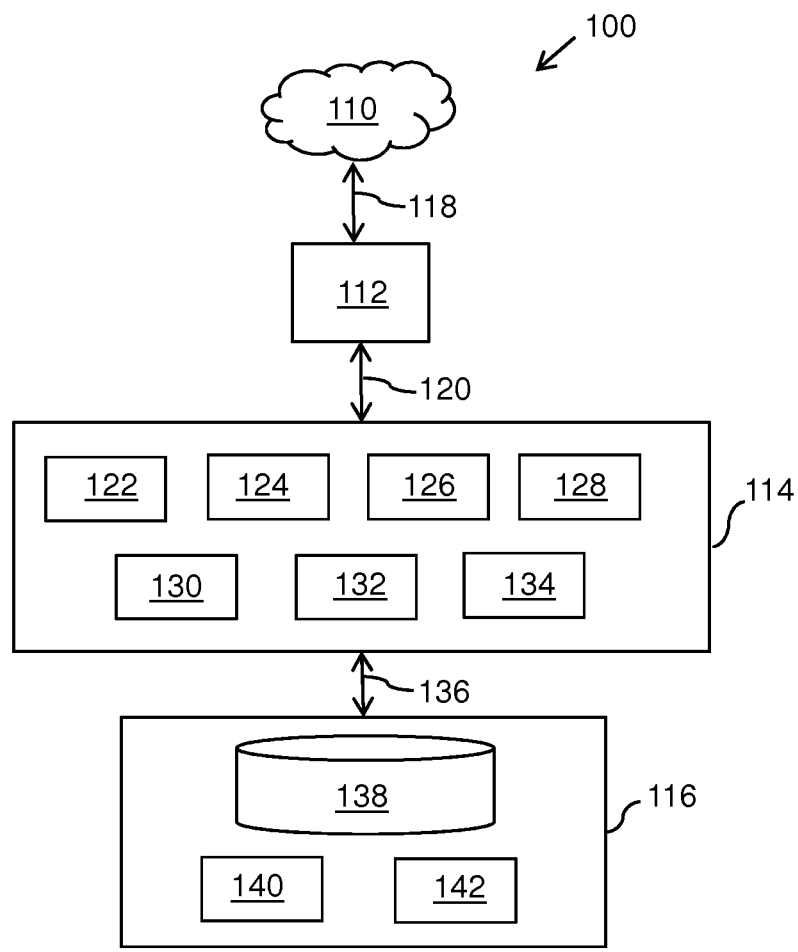
FIG. 1 is a block diagram of a system for managing indoor positioning data of a site having a plurality of zones, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for managing indoor positioning data of a site having a plurality of zones. The system comprises a plurality of sensors arranged in the plurality of zones for forming at least one sensor network. The at least one sensor network is operable to collect positioning data of the at least one communication device visiting the site and the plurality of sensors. The at least one sensor network comprises an exit point for forwarding the collected positioning data based on at least a pre-determined time and a status of the least one communication device. The system also comprises a processing unit for receiving the forwarded positioning data from the at least one sensor network. The processing unit comprises a positioning module for determining spatial position of the at least one communication device based on the positioning data of the at least one communication device and the plurality of sensors. The processing unit also comprises a site-map module for providing floor-map information of the site; the site-map module is associated with the positioning module for calibrating installation positions for the plurality of sensors with respect to the plurality of zones. The processing unit further comprises a network configuration module for configuring the at least one sensor network to collect and forward the positioning data, the network configuration module is associated with the positioning module and the site-map module for identifying sensors that define the at least one sensor network. The processing unit also comprises an analytics module for determining aggregated analytics data based on the determined spatial position of the at least one communication device.

In another aspect, an embodiment of the present disclosure provides a method for managing indoor positioning data of a site having a plurality of zones. The method comprises collecting positioning data of at least one communication device visiting the site and a plurality of sensors arranged in the plurality of zones forming at least one sensor network; forwarding the collected positioning data, by an exit point of the at least one sensor network, based on at least a pre-determined time and a status of the least one communication device; and receiving the forwarded positioning data by a processing unit for processing the forwarded positioning data. The processing unit is operable to determine spatial position of the at least one communication device, by a positioning module of the processing unit, based on the positioning data of the at least one communication device and the plurality of sensors; provide floor-map information of the site, by a site-map module of the processing unit, the site-map module is associated with the positioning module for calibrating installation positions for the plurality of sensors with respect to the plurality of zones; configure the at least one sensor network, by a network configuration module of the processing unit, the network configuration module is associated with the positioning module and the site-map module for identifying sensors that define the at least one sensor network to collect and forward the positioning data; and determine aggregated analytics data, by an analytics module of the processing unit, based on the determined spatial position of the at least one communication device.

The following U.S. patent applications of the applicant: Ser. No. 14/716,764 (filed on 19 May 2015), Ser. No. 14/462,715 (filed on 19 Aug. 2014), Ser. No. 14/503,059 (filed on 30 Sep. 2014) and 62/090,933 (filed on Dec. 12, 2014), are incorporated herein in its entirety, by reference.

According to one embodiment, the site may include a retail premises that is suitable for practicing various embodiments of the present disclosure. For example, the site may be a shopping mall or a shopping center, having number of zones generally associated with various products. The site may be partitioned into a plurality of zones, such as various shops, hallways and the like. Further, each of the zones may be associated with a retail context, such as a product category and a brand of a product offered for sale by such zones. For example, the products may include electronic goods, men and women apparels, groceries, toys and the like. Similarly, the services may include salon, game parlor, spa, massage center and the like. Therefore, the context can be either name of the product or service, or the brand of the product or service.

The plurality of sensors is arranged in the plurality of zones for forming at least one sensor network. For example, each zone may include at least one sensor. Further, sensors present in at least one zone may form an ad-hoc sensor network. However, when the entire site is considered, the sensor arranged in the plurality of zones forms a single sensor network having an exit point (explained in detail herein later).

In an embodiment, the plurality of sensors is at least partially implemented by way of a plurality of wireless apparatus that are installed at specific locations within the zones. Examples of such wireless apparatuses include, but are not limited to, wireless routers for Wi-Fi communication, or Bluetooth base stations; "Bluetooth" is a registered trademark. Alternatively, the sensors may include beam breakers, cameras and point-of-sale (POS) apparatus installed at specific locations within the zones.

Further, the at least one sensor network is operable to collect positioning data of the at least one communication device visiting the site and the plurality of sensors. The at least one communication device is at least one of a Wi-Fi enabled device and a Bluetooth enabled device. In an example, the communication device includes, but is not limited to, mobile phones, smart telephones, Mobile Internet Devices (MID's), tablet computers, Ultra-Mobile Personal Computers (UMPC's), phablet computers, Personal Digital Assistants (PDA's), web pads, and handheld Personal Computers (PC's), carried by the shoppers (visitors) visiting the site. Additionally, the communication device may include devices attached to, for example, shopping carts, and carried by the visitors.

In an embodiment, when the shoppers move in and around the zones and the hallway within the site, the corresponding communication device communicates with the sensors. In an example, the communication device may be provided with suitable hardware and/or software applications that support wireless communication, such as Wi-Fi and Bluetooth technology. For example, the sensors may include hardware that is capable of receiving signals on all IEEE 802.11x approved wavelengths.

As mentioned above, the at least one sensor network is operable to collect positioning data of the at least one communication device visiting the site and the plurality of sensors. In an example, the positioning data of the communication device comprises at least one of radio signal strength corresponding to at least one radio packet transmitted from at least one communication device to the plurality of sensors. For example, the radio packet may be generated and transmitted by the communication device and received by the plurality of sensors. Further, the radio packet may be processed to determine the radio signal strength corresponding to such radio packet.

In another example, the positioning data of the plurality of sensors comprises radio signal strength corresponding to at least one radio packet transmitted between the plurality of sensors. In such instance, the radio packet may be generated and transmitted by the sensors and also received by the sensors. The radio packet may be further processed to determine radio signal strength corresponding to such radio packet.

According to an embodiment, the positioning data collected by the at least one sensor network also comprises a sensor identity, a communication device identity, a site identity and a zone identity. For example, the sensor identity may be associated with a sensor, the communication device identity may be associated with a communication device, the site identity may be associated with a site at which the sensor is arranged and the zone identity may be associated with a zone (of the site) at which the sensor is arranged. Therefore, while collecting the positioning data of the communication device, the communication device identity may be associated with the sensor identity to consider the site and zone information. Accordingly, the positioning data of the communication device may essentially include the radio signal strength corresponding to the radio packet transmitted by the communication device, the sensor identity (receiving the transmitted radio packet), the communication device identity, the site identity and the zone identity. However, the positioning data of the sensors may include the radio signal strength corresponding to the radio packet transmitted and received by the sensors.

In an embodiment, the communication device may transmit its identification codes (ID i.e. identity) to the sensors on their own. Alternatively, the sensors may send a request for identification to the communication device, which may then transmit its ID to the sensors. According to an embodiment, the ID may, for example, be Media Access Control (MAC) address pertaining to the communication device. Additionally, the ID may include Terminal Identifier (TID), Service Set Identifier (SSID) or other identification pertaining to the portable communication devices.

The at least one sensor network comprises an exit point for forwarding the collected positioning data. In an embodiment, an ad-hoc network covering, for example, a particular section of the site, comprises at least one exit point. However, the entire sensor network comprises a plurality of such ad-hoc networks (covering the entire site) and one exit point thereof. The exit point may be a sensor providing a route for forwarding the positioning data (coming from all the sensors within the sensor network) for further processing by the processing unit. Otherwise, the exit point may be just a data router other then the sensor.

In an embodiment, each sensor of the sensor network runs on its own independent operating system, operable to collect and deliver the positioning data to the processing unit. In operation, each sensor constantly measures the radio signal strength of the communication device and the other sensors in the vicinity. Therefore, each sensor may include means for identifying signals coming from the communication device and from another sensor.

Further, the collected positioning data by the at least one sensor network may be forwarded based on at least a pre-determined time and a status of the least one communication device.

In an embodiment, the pre-determined time for forwarding the collected positioning data comprises positioning data, in a synchronized packet format, collected by the at least one sensor network over a specific time period. In an example, the observations for the synchronized packet format depend on a number of communication devices present in the site and time. In order to keep time and observations consistent, a packaging window is synchronized for all sensors defining a sensor network of a site. The term "packaging window" used herein may be associated with the specific time period in which the sensors collect the positioning data therefrom. In an example, the packaging window may be relatively short, typically 5 seconds. Alternatively, the packaging window may be 1-20 seconds. Further, the packaging window may be adjusted according to a network delays (i.e. a longer delay corresponds to a longer window) and other environmental parameters (such as the floor-map information of the site).

Thereafter, the sensors are configured to group the positioning data measured during such timeslots into packets and forward the packets for further processing. Further, all the sensors are configured to group the positioning data based on the timeslots (i.e. in a synchronized manner). Typically, the positioning data corresponding to the communication device may be forwarded until multiple radio packets transmitted by the communication device are determined. However, the positioning data measured and forwarded in packets make the processing of the positioning data faster. For example, the communication device in a zone may be identified 30-40 seconds earlier as compared to a conventional processing. Further, a shopper carrying such communication device may walk 50-100 meters during that 30-40 seconds, therefore the positioning data measured and forwarded in packets may enable in fast-tracking of the shopper, which in turn may enable in providing better reaction time for targeted advertising.

In another embodiment, the status of the at least one communication device comprises a known communication device and an unknown communication device. Further, the known communication device further comprises an effective communication device and an ineffective communication device. For example, the known effective communication device may include the communication device (having identity, such as MAC address) belonging to a priority list (associated with shoppers opted-in for a loyalty program of the mall i.e. for targeted advertising program). Further, the known ineffective communication device may include the communication device (having identity, such as MAC address) belonging to machines, employee and opt-out devices.

In an embodiment, the MAC number of the known effective communication devices and the known ineffective communication devices may be maintained in various lists (corresponding to the categories thereof). Further, if MAC number does not belong to any of the lists (the unknown communication device), i.e. the observation corresponding to such communication device may be send to buffer, for example appended as visitor type. Further, the unknown communication device may be further categorized into the effective communication device and the ineffective communication device. Specifically, based on analysis of the positioning data collected from the unknown communication device, the categorization of the unknown communication device is performed. For example, if the positioning data remains constant for a communication device (i.e. belonging to machines or employee) then such communication device may be categorized into known ineffective communication device. In addition, if a communication device with subsequent visit opts-out for a loyalty program, then such communication device may be categorized into known ineffective communication device. However, if a communication device opts-in for a loyalty program with subsequent visit, then such communication device may be categorized into known effective communication device.

According to an embodiment, in order to reduce processing load of the system of the present disclosure, the observations from the ineffective communication device should be filtered out. For example, observations corresponding to persons belonging to staff, machines, visitors who has expressed their wish to not be part of any behavioral analytics. In one embodiment, a number of opt-in devices may be also considered, so that the system can better estimate an overall shopper's behavior with respect to a site. Further, in case of an emergency, such as fire in the site, the system may be configured to provide such information to all people present in the site.

In an embodiment, for generating reliable analytics data, the positioning data associated with the ineffective communication devices may be removed. In one example, this may be performed by using a list of the ineffective communication device as identifiers for filtering out the positioning data associated with such ineffective communication devices. Alternatively, this may be performed by analyzing the positioning data of the unknown communication devices for a pre-determined time and pre-determined criteria (such as positioning data being constant). In an example, the system may include a filtering module for filtering out the positioning data associated with the ineffective communication devices. For example, the filtering module may use opening hours of a site and a set of heuristics of typical employee behavior to identify store employees and filter them out. Alternatively, the filtering module may use the store opening hours, MAC addresses and the set of heuristics to identify static devices, such as machines.

In one embodiment, the system of the present disclosure further comprises a pre-processing module for transcoding the positioning data collected from the at least one sensor network for providing uniform positioning data to the processing unit. In an example, the pre-processing module comprises of elements that transcode the incoming observation data, collected from the exit point of the sensor network. For example, the exit point of the sensor network provides observation data in different formats and protocols, and the pre-processing module converts that into a unified format and protocol.

In an embodiment, a sensor among the sensor network may act as a partial processing means that may be configured to partially process the collected positioning data of the sensor network. Alternatively, a mini positioning engine may be implemented within the sensor network for partial processing of the collected positioning data. This enables in reducing network traffic between the sensor network and the pre-processing module.

In another embodiment, when some sensors, such as counters, may provide only elementary data without mandatory data, such as sensor identity and timestamp fields. The pre-processing module adds such missing data fields. The pre-processing module then forwards the transcoded observation data to the processing unit using some communication network. In an example, the communication between the sensor network and the pre-processing module may employ data compression to reduce communication overhead.

In an embodiment, a communication network between the exit point of the sensor network and the pre-processing module, and a communication network between the pre-processing module and the processing unit may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

As mentioned above, the system also comprises the processing unit for receiving the forwarded positioning data from the at least one sensor network or the pre-processing module.

The processing unit comprises a positioning module for determining spatial position of the at least one communication device based on the positioning data of the at least one communication device and the plurality of sensors. According to an embodiment, the positioning module receives the collected data from the sensors and uses it to calculate the most probable position (i.e. spatial position) for the communication device.

In an embodiment, the positioning module uses known signal characteristics for each sensor or groups of sensors when calculating the spatial position. For example, such characteristics include the Rx dBi antenna sensitivity of the sensor antenna, a value for noting the amount of obstruction between the receiving sensor and the transmitting communication device, a value for noting the amount of signal distortion to expect in the zone. The signal characteristics (the values above) are calculated by running an algorithm that compares the known true distances between the sensors and the calculated observed distances. In addition to this, known recording locations where a communication device has been stationed during a period of time, may be calculated using following formula:

$$d=((1.0/(10.0*n))*((tx-dBm+txg+rxg-x+20 \log 10(w)-20 \log 10(4*\pi)))^{[<]BEGINITALm10}$$

where, txg and rxg are device specific
n represents signal propagation, for example 3-7
x represents number of obstacles
w=wavelength The formula above is solved for n and x based on measurements, and run through the sensors in the vicinity to yield optimized values. The optimization is done with, for example, using a Monte-Carlo method.

In one embodiment, the positioning module can function in two distinct ways, presence detection (proximity) or positioning (latitude, longitude coordinates within a space), for determining spatial position of the at least one communication device.

According to an embodiment, during the presence detection, a site (or zone) having multiple sensors are grouped together to cover the entire site. Further, each sensor may have its own proximity requirement. For example, each sensor may include an inner circle representing a predefined cut-off value for receiving probes with less signal amplitude, which are omitted from the position detection process, but are calculated as passers-by. Further, each sensor may include an outer circle, i.e. a maximum distance for which the sensor can hear a normal probe signal emitted by some communication device. The cut-off value is adjusted for each sensor to get best coverage for the site. In another embodiment, the sensors may be associated with a secondary cut-off value that limits the amount of passers-by to just those that are outside of the site rather than everyone who is in detection range. This increases the reliability for the passers-by number.

Further, during the presence detection, once a shopper is detected inside the site, a session is started and continues until the shopper is no longer detected within the site. Also, all the zones visited during the session are saved in-order, including detailed data of each visited zone. Typically, the signal strength measurements are inherently unreliable due to effects such as multipath propagation. Therefore, in presence detection, a special algorithm may be used for reliably tracking transitions of the communication device from one zone to another zone. For example, the special algorithm may assume that the zone transitions are not immediate. Further, the special algorithm compares the change that the shopper is still in his current zone with the chance that the shopper has transitioned to a new zone, with a slight weight on remaining in his current zone. This ensures shoppers do not "jump" from zone to zone simply because they are standing on the border between two zones. In an example, the algorithm may include is sliding median filter.

According to an embodiment, during the presence detection, the latitude and longitude coordinates belonging to the communication device are collected and examined to see if the communication device appears within a pre-defined boundary (for example, within the site) and further if the communication device appears within a pre-defined boundary within the site (for example, a zone associated with clothing or vegetables). Therefore, each visit within the site will start a session that continues until the communication device is no longer visible within the site. Further, each visit within the each zone starts a separate "zone session" that continues until the device is no longer visible within the zone. Therefore, the site visit encompasses all the zone visits. Moreover, all zones visited during the session are saved in-order, including detailed data of the visited zone. As mentioned above, a special algorithm may be used for reliably tracking transitions of a communication device from one zone to another zone. For example, the special algorithm may assume that the zone transitions are not immediate. Further, the special algorithm compares the change that the shopper is still in his current zone with the chance that the shopper has transitioned to a new zone, with a slight weight on remaining in his current zone. This ensures shoppers do not "jump" from zone to zone simply because they are standing on the border between two zones. In an example, the algorithm may include is sliding median filter.

As mentioned above, the positioning module determines the spatial position of the at least one communication device based on the positioning data of the at least one communication device and the plurality of sensors. Specifically, the positioning data corresponds to radio signal strength of the radio packets transmitted from the at least one communication device to the plurality of sensors, and radio signal strength corresponding to the at least one radio packet transmitted between the plurality of sensors. In an example, Received Signal Strength Indication (RSSI) measurements may include monolateration, bilateration, trilateration and multilateration methods, based on a number of sensors communicating with a communication device (carried by the shopper) and the cut-off value of the sensors.

In an example, the positioning module calculates spatial positions in the x, y, z planes using a modified version of spherical trilateration, which requires at least three distances (circles) between transmitter (the communication device) and receiver (sensors) to overlap for a spatial position to be calculated. Further, in one embodiment, the spherical trilateration process may be modified by considering an inherent error in distance measurements based on a signal strength between the transmitter and the receiver, which is compensated by allowing an adjustable margin of error when looking for overlapping spheres. Also, an algorithm checks (a few, for example five) permutations of the 3 distances to see if the circles may overlap if they were slightly adjusted. In another example, the algorithm may be adjusted to accept positioning data from two observations (bilateration) allowing for a greater number of spatial positions to be calculated at the cost of lost accuracy, which may act as a fallback mechanism. Additionally, if the bilateration fails and one sensor reads the communication device, the spatial position is considered based on that one sensor only. Moreover, if more than three sensors read the communication device, the additional data can be used to improve the accuracy for calculating the spatial position using multilateration.

According to an embodiment, the positioning module is also configured to process the positioning data in a dual manner, i.e. based on the pre-determined time and the status of the least one communication device, to determine the spatial position. The pre-determined time manner is a reliable pipeline and its main feature is to delay processing until all relevant observations (positioning data) corresponding to the positioning data have been collected (or arrived). The status manner is a first appearance pipeline (FAP). The purpose of FAP is to ensure as fast as possible processing of the positioning data, which includes identifying, priority shoppers as early as possible.

In an embodiment, the positioning module further comprises a memory graph for maintaining positioning data associated with the plurality of sensors. The memory graph enables the positioning module to identify and consider missing positioning data, associated with a sensor excluded from the at least one sensor network, while determining the spatial position of the at least one communication device. The memory graph maintains positioning data of each sensor and its closest neighbors. The memory graph may be used to evaluate each received data stream for missing data that may have occurred due to a bad data connection. For example, if the missing data is detected, then the data stream will be cached for a short period of time (grace period), giving the missing data a window to arrive. Further, when the grace period is over the cached data will be processed again as part of a new batch of arrived data, and if the missing data has arrived then this will result in better accuracy of the determined spatial position.

In an embodiment, the processing unit further comprises a site-map module for providing floor-map information of the site; the site-map module is associated with the positioning module for calibrating installation positions for the plurality of sensors with respect to the plurality of zones. The floor-map information enables in finding properties related to the site. In an example, the properties include objects and structures that may influence the radio signal propagation (reflectance, attenuation). Further, the properties may be classified into permanent and dynamic in nature. Specifically, the permanent properties may include physical structures, such as walls, windows, (metallic) shelves and the like; whereas the dynamic properties may include physical objects, such as people, goods on shelves and the like.

In an embodiment, the floor-map information of the site may be provided as a floor plan associated with the site. In the floor plan, the placement of the sensors is also depicted on top of the floor map. Thereafter, an installer (for example a person) is instructed to go into pre-determined calibration points and activate a calibration application on a communication device (for example smart phone) carried by the installer. The calibration application starts sending radio probes, from the communication device carried by the installer, from the pre-determined calibration points. The radio probes send by the communication device of the installer is different from the radio probes send by the communication devices carried by the shoppers. Therefore, the site-map module is configured to identify such difference, and consider radio probes transmitted by the communication devices of the installer.

In an embodiment, the radio probes may be received by the positioning module to determine the positioning data associated with the communication device of the installer and the sensors. For example, the installer takes few recordings around the pre-determined calibration location by holding the communication device (the device executing the calibration application), which transmits out Wi-Fi packets and records timestamps for the individual pre-determined calibration points. These recordings will then be run through an algorithm that intelligently tries different combinations of settings for the sensors and identifies one setting that achieve the highest amount of reliable positioning data.

In one embodiment, the algorithm goes through each distance measurement from each sensor and compares an estimated distance to a true distance. It uses the relative error between the estimated distance and the true distance to select the most accurate sensor group, for each sensor separately, until the group of sensors that gives the most accurate result is found. In another embodiment, an algorithm tries each available combination of sensors and sensor groups and runs through the complete positioning algorithm for each recording of which the sensor in question is part. The sensor group that provides the best end results, defined as the one that gives the lowest relative positioning error, and based on that, spatial positions of the sensors are selected as installation positions for the plurality of sensors.

The site-map module accordingly enables in determining signal propagation in real, physical environment situation, i.e. based on the floor-map information. The calibration process accordingly provides a virtual understanding of space in the site and how it affects the signal reception capabilities of each sensor. Therefore, the site-map module allows in creating a visualized connection of each sensor within the mesh network. Also, the site-map module allows in highlighting locations where there is a bad connection between sensors, i.e. more sensors should be added or position of the sensor should be altered.

In an embodiment, the calibration process (for identifying installation positions for the plurality of sensors) may be performed manually by a person. Alternatively, an autonomous or radio controlled drone type device, such as quadcopter or car with antenna having controllable height, may be used for the calibration process. In another embodiment, using the positioning data associated with the communication device of the installer, a 2D heat map may be created to illustrate gaps in the positioning coverage.

According to an embodiment, the positioning module may be associated with the site-map module for using information (or data) associated therewith. In an example, the positioning module uses sensor positions, sensor elevation, sensor-to-sensor distances, exclusion zones (areas with poor observations), positioning rails (positions can only be in a straight line, e.g. corridors) and wall in the area (to estimate risk of multipath propagation), provided by the site-map module. Specifically, such information may be associated with the floor-map information of the site.

According to an embodiment, the processing unit further comprises a network configuration module for configuring the at least one sensor network to collect and forward the positioning data. The network configuration module is associated with the positioning module and the site-map module for identifying sensors that define the at least one sensor network. In one embodiment, the network configuration module is operable to at least add and delete sensor from a sensor network to define the at least one sensor network.

In an embodiment, the sensors are configured to send probe requests at defined intervals, such as few seconds. Further, all the sensors send the incoming signal data from adjacent sensors and the communication device of the shoppers (in the vicinity of the sensors). The signals from the adjacent sensors are an indicator of how well the adjacent sensors are communicating. These observations are continuously sent for processing and logged as time series data in an incoming layer of the network configuration module. The observations are used to detect anomalies in the site, for example, caused by obstructions, changes in layout or large number of communication devices in the site.

In an embodiment, the network configuration module senses if a sensor has dropped out from a sensor network or a new sensor is added to the sensor network, to initiate a calibration process for defining the at least one sensor network (having a single exit point) for a site. Specifically, this enables in configuring the at least one sensor network, which collects and forwards the positioning data from the sensors to the positioning module for determining the spatial position of the at least one communication device in the site. In an example, if a sensor has failed to report (or communicate), that sensor will simply be ignored based on this calculation:

```
{
origin: "00:12:34:56:78:90", // i.e. sensor MAC address
time: 12312321412 // i.e. time of recordation
nodes: [
        [11:11:11:11:11:11, −76],
        [22:22:22:22:22:22, −66] // i.e. [received sensor MAC address,
    signal strength in dBm]
    ]
}
```

As mentioned above, each sensor will report an observation containing data on how it has observed all neighboring sensors. The network configuration module analyzes this data stream, together with all the existing streams from the other sensors. The network configuration module will use a best effort approach and only use the data that is available when doing the analysis.

According to an embodiment, the processing unit further comprises a partition module for partitioning the positioning data to be processed by the positioning module to determine the spatial position of the at least one communication device. Specifically, using an auto-balancing partition module, it is possible to balance a processing workload associated with various modules. In an example, the partition module is operable to partition the positioning data, based on the zone identity, i.e. between a plurality of processing nodes (or element) of the positioning module. Specifically, the data for each site may be always processed by the same data processing node of the positioning module (while determining spatial positions of communication devices). Further, data to be processed may be spread (or divided) evenly between the processing nodes. Moreover, each processing node may be backed up by several other processing nodes to provide robustness to the positioning module.

In an embodiment, the partition module may enable in partitioning all site data consistently among processing nodes, i.e. a site identity (ID) is used as partitioning key. For example, the site ID is used as a hash key, i.e. observation are spread using Site_ID % (number of partitions), where % denotes modulus operation. Alternatively, the observations originating from different communication devices are spread among processing nodes using a similar modulus formula, in which a MAC address is transformed into the hash key.

According to another embodiment, as mentioned herein, all observation data from a site is handled by a dedicated data processing node. Therefore, when the number of sensors grows so big that the processing power of the positioning module is not sufficient, a new positioning module may be installed and data (to be processed) may be divided between the old and the new positioning modules.

In one embodiment, the MAC addresses (communication device identity) may be hashed for privacy protection purposes prior to sending data associated therewith for further processing. Further, when there may be a situation of site-in-site, i.e. there is a client inside other client's premises, but the observations are handled by a same processing unit of the site, one client's data may be separated from another's. For this purpose, the hashing may be keyed using a site specific identifier.

According to an embodiment, the processing unit further comprises a caching module for storing and retrieving the collected positioning data and the determined spatial position. The caching module is configured to store the positioning data and the determined spatial position associated with various modules, such as the positioning module, the site-map module and the network configuration. Further, the caching module may receive all updates (with respect to the positioning data and the spatial position) in real-time and such updates may be retrieved on demand. Furthermore, various modules may use the same data, i.e. if one module reads raw sensor data it will not be deleted from the caching module, and same data may retrieved by another module.

In an embodiment, while storing the positioning data and the determined spatial position in the caching module, such data may be arranged under various topics, which may act as identifier. In an example, the topics may include an inter-sensor data topic and a normal observation data topic. Further, data belonging to different topics may include different lifetimes. For example, the inter-sensor data topic may be configured to have a relatively short lifetime since it is used in the iterative process of sensor network calibration and after iteration, the data may be thrown away. However, the normal observation data topic may include longer lifetime, for example 10 days, since it may be needed later for specific movement/behavioral analysis of the shoppers. The caching module enables in dynamically increasing processing power, particularly, for the positioning module with immediate retrieval of the segregated data under different topics.

According to an embodiment, the processing unit also comprises an analytics module for determining aggregated analytics data based on the determined spatial position of the at least one communication device. Specifically, the analytics module may be responsible for creating the aggregated analytics data, based on the calculated positioning data. For example, the aggregated analytics data comprises at least one of a visiting path, a visit frequency, a visited zone, a dwell time and a visiting time of the at least one communication device. The visiting path of the at least one communication device may be associated with a path followed by a shopper (carrying the communication device) while shopping in the site by visiting various zones of the site. Further, the visit frequency may be associated with number of visits made by a shopper (carrying the communication device) to a particular site and zone thereof. Furthermore, the dwell time may be associated with an amount of time spend by a shopper (carrying the communication device) in a particular site and zone thereof. Moreover, the visiting time may be associated time of the day when a shopper visits a site for shopping.

In one embodiment, the analytics module may be configured to follow communication devices, closely and as fast as possible, belonging to shoppers who have opt-in loyalty program of the site. The observations from such devices may be treated with prioritized processing, even if a single observation of such devices is identified. In other words, such communication devices may be categorized as very important persons' devices. In order to perform this, the sensor network (at least the exit point thereof) may have quick access to the list of MAC addresses belonging to the very important persons' devices. Additionally, the exit point of the sensor network may have access to lists of MAC addresses of the communication devices, such as opted-out loyalty program, machines and employees. Further, the lists of such MAC addresses may be updated and forwarded to the exit point of the sensor network when changes are detected in the lists. This enables in reducing communication between the sensor network and the processing unit.

In an embodiment, the processing unit further comprises an advertising module for selecting advertisement to be displayed in the plurality of zones based on the aggregated analytics data of the at least one communication device. In an example, the visiting paths of the communication devices (carried by shoppers) are based on the movement of the shoppers with respect to the various zones of the site. In other words, the visiting paths are associated with the zones visited by the shoppers for buying or seeing the products available in such zones. Further, the time spent (dwell time) by the shoppers during their visits to such zones also forms a part of such paths. The each of the plurality of zones may be associated with a retail context, therefore the paths becomes a function of retail contexts of the zones visited by the shoppers in sequence.

In an example, the retail context may include, such as Electronics, Men's clothing, Vegetables, Shoes, Women's clothing and the like. Also, the visiting path may include counters for the retail contexts of the zones visited by the communication device. Further, the counters associated with the retail contexts changes with the number of revisits. The number of revisits changes the visiting frequency and the dwell time. Therefore, a visiting path with altered counters is saved for further analysis by the processing unit. Further, the visiting path may be saved with a corresponding ID of the communication device carried by the shopper following the path in the site. Similarly, paths for other communication devices making trip to the site are saved for further analysis by the processing unit. For example, when a shopper (or group of shoppers) visits a zone area according to a predefined path, the analytics module may create an event that gets forwarded to a third party service provider or the advertising module. These triggers can be used to notify the third party service provider to take an appropriate action, such as send a short message service (SMS) or push message, on the communication device, regarding the targeted advertising. Otherwise, the advertising module may use such information for providing targeted advertising to the shoppers.

According to an embodiment, the system of the present disclosure further comprises a plurality of digital signages arranged in the plurality of zones for displaying the selected advertisement. In an example, based on the analysis of the visiting paths of the communication devices (making trip to the site), the advertisement is selected. Further, the digital signage may be physically arranged (or installed) at various spatial locations within the site, such as within the zones or hallways of the site.

In one embodiment, the system according to the present disclosure further comprises at least one database for storing at least the aggregated analytics data determined by the analytics module and advertisement content to be selected by the advertising module. In an example, the system may include a database, for the storing only the aggregated analytics data determined by the analytics module, such as Apache Cassandra or Amazon Redshift. Further, the database for storing the advertisement content (to be selected by the advertising module) may be associated with a third party service provider responsible for managing the advertisement content. The advertisement content from such service provider may be requested by the advertising module for being displayed on the plurality of digital signages (arranged in the site). Therefore, the system of present disclosure enables in providing targeted advertising to shoppers in the site based on shopping behavior of the shoppers present in the site. For example, when one or more known communication devices are identified in some zone of a site at a given time, this information may be forwarded to the advertising module, which then performs targeted advertising based on shoppers profile, behavior and/or location. Further, the advertising module may also trigger targeted advertising based on a number of shoppers in the site.

In an embodiment, the database stores all relevant data for a required time period and may be queried to provide answers to questions associated with (aggregated analytics data), such as a visiting frequency, visited zones, an average dwell time for each visited zone and a visiting time of a communication device. In an example, the database may provide an API that serves all the analytics data via HTTP requests using, for example, JSON formatting for a dashboard.

According to an embodiment, the database provides smart caching API's for aggregated analytics data. Specifically, to make the data accessible for clients (such as owner of a zone or a site), a smart caching procedure is used to store as much relevant data in a random access memory (RAM) as possible. A large site can contain several clients, i.e. each client owns their specific data, and generally, such data between sites is not shared. However, parts of the system hardware can be shared between clients, as typical in cloud processing. In an example, an algorithm chooses which data to be kept in the RAM based on time (for example, last week data may be always in RAM or last month(s) data for popular sites may be always in RAM). Further, the algorithm chooses data to be kept in the RAM based on a client's activity.

The present disclosure provides a system and a method for managing indoor positioning data of a site having a plurality of zones. The system and method uses segregation of data (for example positioning data collected by a sensor network) at various processing levels making the processing of the data faster and the system and method more efficient in terms of managing the indoor positioning data. The system and method further uses a distributed message queue processing architecture, which provides following advantageous, i.e., multiple sensor may post observations in a queue, multiple observations for clients may be attached to a single queue, the queuing infrastructure ensures observations are delivered exactly once, observations may be successfully submitted to a queue even if corresponding sensors are not running or are unreachable. Further, the use of distributed message queue processing architecture provides system and method scalability, reliability and anonymity (as shoppers are not directly associated). Based on above, the system and method of the present disclosure enable in managing indoor positioning data in a reliable, real-time, scalable as well as cost-efficient manner.

DETAILED DESCRIPTION OF THE DRAWINGS

Referring to FIG. 1, illustrated is a block diagram of a system 100 for managing indoor positioning data of a site having a plurality of zones, in accordance with an embodiment of the present disclosure. The system 100 includes at least one sensor network, such as a sensor network 110, a pre-processing module 112, a processing unit 114 and a database 116.

The sensor network 110 comprises a plurality of sensors arranged in the plurality of zones for forming at least one sensor network, such as the sensor network 110. The sensor network 110 is operable to collect positioning data of at least one communication device (not shown) visiting the site and the plurality of sensors. Further, the sensor network 110 is operable to forward the collected positioning data to the pre-processing module 112 via a communication network 118, for example one of a wired IP network and Wi-Fi. Specifically, the sensor network 110 comprises an exit point for forwarding the collected positioning data based on at least a pre-determined time and a status of the least one communication device.

The pre-processing module 112 is operable to transcode the positioning data collected from the at least one sensor network, such as the sensor network 110 for providing uniform positioning data to the processing unit 114 via a communication network 120. The processing unit 114 is operable to receive the forwarded positioning data from the at least one sensor network, such as the sensor network 110 and process thereafter. Further, the processing unit 114 is operable to transmit back control and configuration messages to the pre-processing module 112 and the sensor network 110.

As shown, the processing unit 114 comprises a positioning module 122, a site-map module 124, a network configuration module 126, a caching module 128, a partition module 130, an analytics module 132 and an advertising module 134. The positioning module 122 is operable to determine spatial position of the at least one communication device based on the positioning data of the at least one communication device and the plurality of sensors. The site-map module 124 is operable to provide floor-map information of the site. The site-map module 124 is associated with the positioning module 122 for calibrating installation positions for the plurality of sensors with respect to the plurality of zones. The network configuration module 126 is operable to configure the at least one sensor network, such as the sensor network 110 to collect and forward the positioning data. Further, the network configuration module 126 is associated with the positioning module 122 and the site-map module 124 for identifying sensors that define the at least one sensor network, such as the sensor network 110.

The caching module 128 is operable to store and retrieve the collected positioning data and the determined spatial position. The partition module 130 is operable to partition the positioning data to be processed by the positioning module 122 to determine the spatial position of the at least one communication device. In an example, the partition module 130 is operable to partition the positioning data, based on the zone identity, and between a plurality of processing nodes of the positioning module 122. The analytics module 132 is operable to determine aggregated analytics data based on the determined spatial position of the at least one communication device. The advertising module 134 is operable to select an advertisement to be displayed in the plurality of zones based on the aggregated analytics data of the at least one communication device.

The processing unit 114 is further operable to transmit various modules data, for example the aggregated analytics data (for being stored and retrieve for later analysis), to the database 116 via a communication network 136. Further, the database 116 is shown to include a storing module 138 for storing at least the aggregated analytics data determined by the analytics module 132 and the advertisement content to be selected by the advertising module 134. In an example, the advertisement content (to be selected by the advertising module 134) may be associated with a third party service provider responsible for managing such advertisement content. Further, the database 116 provide application programming interfaces 140 and 142, that serves the aggregated analytics data via hypertext transfer protocol (HTTP) requests, to clients such as owners of the site or zones thereof.

Figure 2:
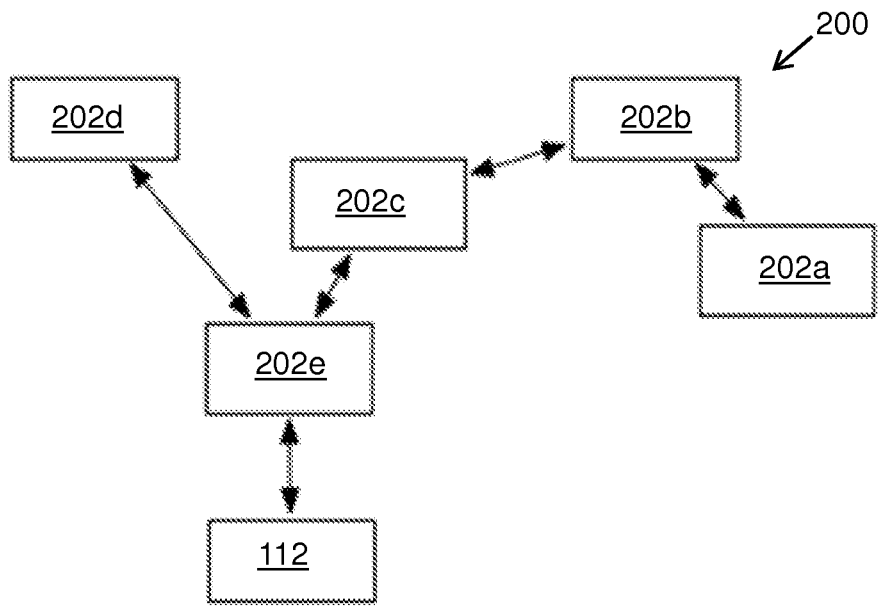
FIG. 2 is an example illustration of a block diagram of a sensor network, in accordance with an embodiment of the present disclosure.

Referring to FIG. 2, illustrated is an example illustration of a block diagram of a sensor network 200, in accordance with an embodiment of the present disclosure. As shown, the sensor network 200 comprises a plurality of sensors, such as sensors 202a, 202b, 202c and 202d and an exit point 202e. The sensor network 200 is operable to collect the positioning data of the at least one communication device visiting the site and the plurality of sensors, such as the sensors 202a, 202b, 202c and 202d. As shown, the sensors 202a, 202b and 202c are operable to interact with each other and forward the collected positioning data to the exit point 202e thereafter. For example, the sensors 202a, 202b and 202c form an ad-hoc network within the sensor network 200. Further, the sensor 202d is also operable to forward the collected positioning data thereof to the exit point 202e. As shown, the exit point 202e is further operable to forward the collected positioning data to the pre-processing module 112 (shown in FIG. 1) via the communication network 118.

Figure 3:
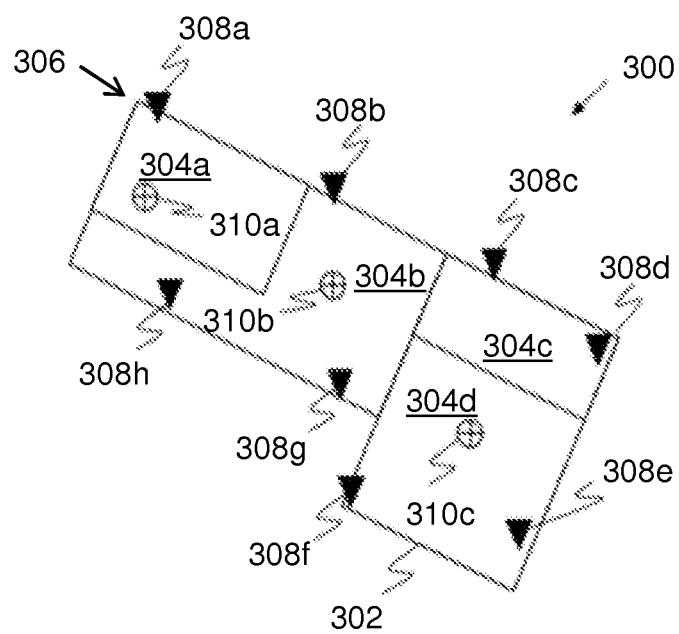
FIG. 3 is a schematic illustration of an example floor map of a site having a plurality of zones arranged with a sensor network, in accordance with an embodiment of the present disclosure.

Referring now to FIG. 3, illustrated is a schematic illustration of an example floor map 300 of a site 302 having a plurality of zones, such as zones 304a-d arranged with a sensor network 306, in accordance with an embodiment of the present disclosure. The site-map module 124 (shown in FIG. 1) provides the floor map 300 and the floor-map information associated with the floor map 300. As shown, the sensor network 306 comprises a plurality of sensors, such as sensors 308a-h arranged in the zones 304a-d. Further, the floor map 300 provides calibration points 310a-c, where an installer (for example, an owner of the site or a zone) is instructed to go and activate a calibration application (running on his/her communication device, for example, smart phone). The calibration application allows transmission of radio packets from the communication device of the installer to the plurality of sensors, such as the sensors 308a-h.

The site-map module 124 is associated with the positioning module 122 for calibrating installation positions for the plurality of sensors, such as the sensors 308a-h, with respect to the plurality of zones, such as the zones 304a-d. Specifically, the site-map module 124 is operable to provide a virtual understanding of the site 302 and variation in signal reception capabilities of each sensor (of the sensors 308a-h) based on the floor-map information of the site 302. For example, the site-map module 124 is operable to consider the floor-map information of the site 302 to highlight obstacles and impossible locations, in order to further improve on the understanding of the installation positions for the plurality of sensors 308a-h.

Figure 4:
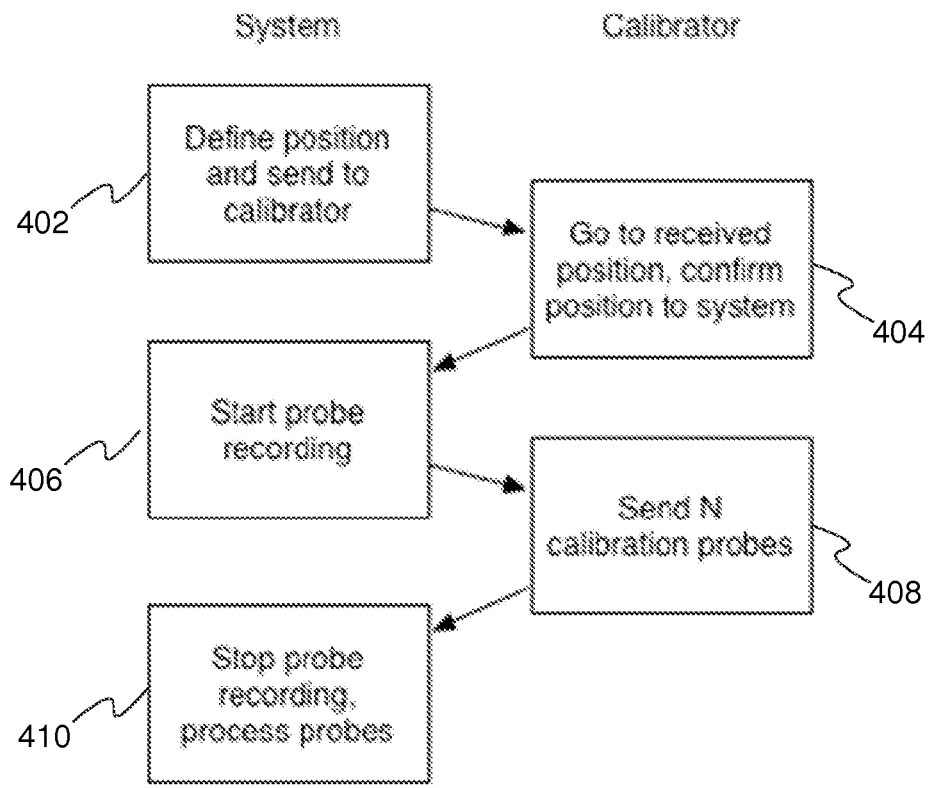
FIG. 4 is a flow diagram depicting steps for calibrating installation positions for a plurality of sensors, in accordance with an embodiment of the present disclosure.

Referring to FIG. 4, illustrated is a flow diagram depicting steps for calibrating installation positions for the plurality of sensors, such as the sensors 308a-h (shown in FIG. 3), in accordance with an embodiment of the present disclosure. Specifically, FIG. 4 depicts steps associated with the system 100 and a communication device of an installer (or a calibrator, for example, an owner of the site or a zone).

As shown, initially, at step 402, at least one calibrating position is defined by the system 100 and transmitted to the communication device of the calibrator.

At step 404, the calibrator is instructed to go to the at least one defined calibrating position. The communication device of the calibrator confirms the at least one calibrating position to the system 100, when the calibrator reaches the defined calibrating position.

At step 406, the system 100 is configured to start a probe recording session.

At step 408, a plurality of radio packets are transmitted by the communication device (associated with the calibrator) and the plurality of sensors, such as the sensors 308a-h.

At step 410, the system 100 is configured to stop the probe recording session. The collected radio packets are processed thereafter.

Specifically, radio signal strength corresponding to the radio packets is measured and analyzed to find spatial position of the communication device (associated with the installer). Also, radio signal strength corresponding to radio packets between the sensors is measured and analyzed to find spatial position of the sensors. Thereafter, the measured radio signal strength is associated with floor-map information of a site, to identify signal reception capabilities of the sensors. Finally, based on the signal reception capabilities of the sensors the calibrate installation positions for the plurality of sensors are identified.

Figure 5:
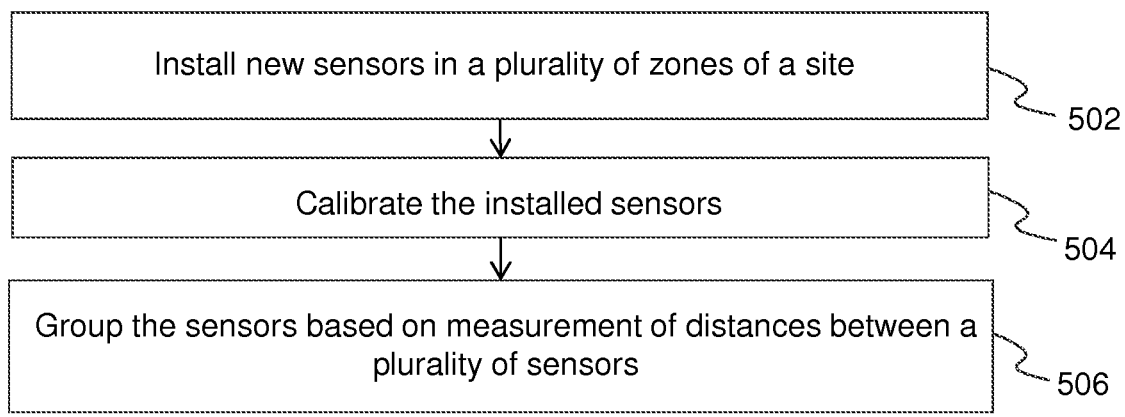
FIG. 5 is a block diagram depicting steps for forming a sensor network, in accordance with an embodiment of the present disclosure.

Referring to FIG. 5, illustrated is a block diagram depicting steps for forming a sensor network, in accordance with an embodiment of the present disclosure. In an example, the sensor network is formed based on measurement of distances between each of the plurality of sensors.

At step 502, new sensors are installed in the plurality of zones, such as the zones 304a-d of the site 302.

At step 504, the installed sensors are calibrated using the steps illustrated in FIG. 4.

At step 506, the sensors are grouped based on the measurement of distances between each of the plurality of sensors, such as the sensors 308a-h.

Figure 6:
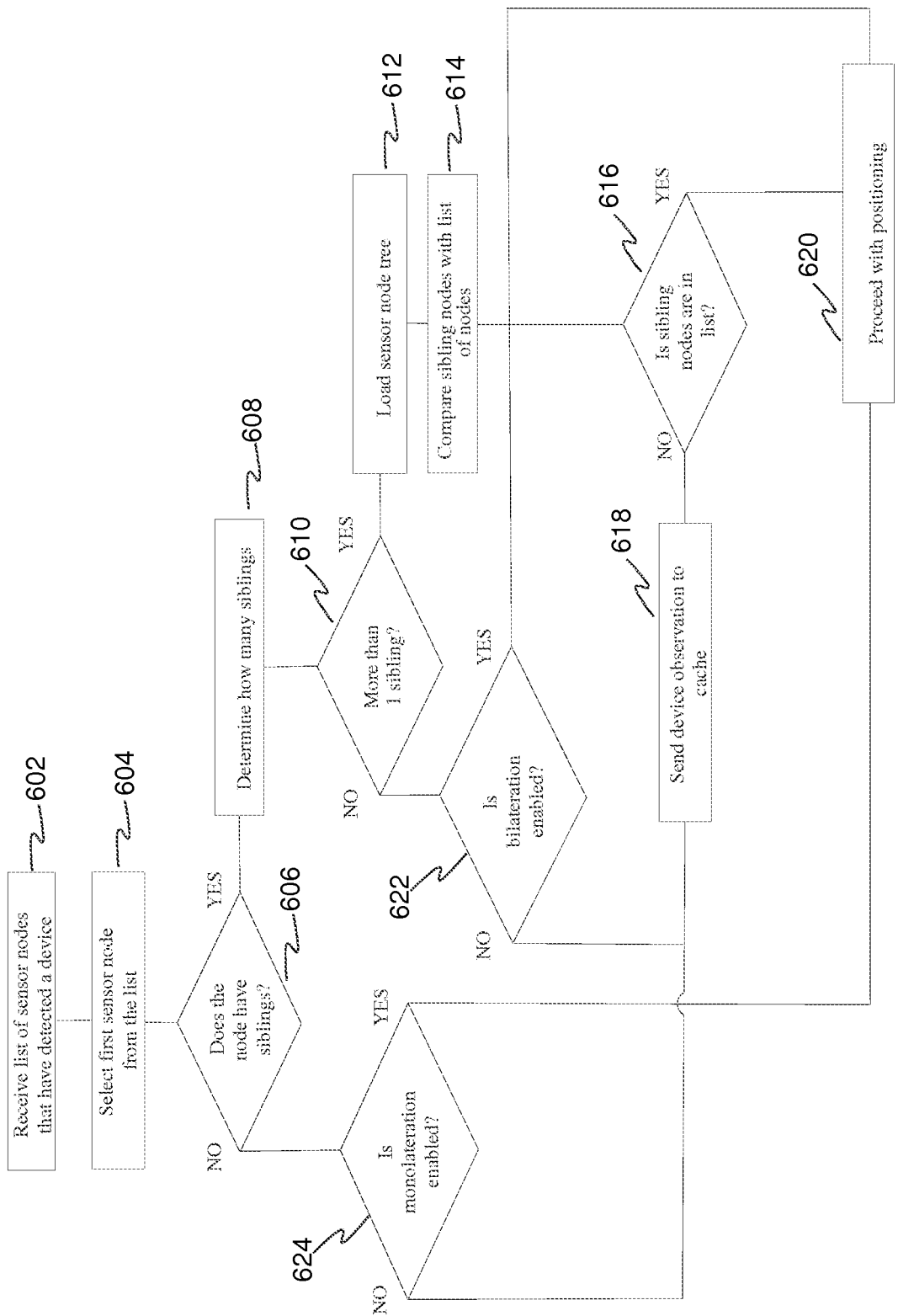
FIG. 6 a flow diagram for decision-making process of a positioning module for finding spatial position of a communication device, in accordance with an embodiment of the present disclosure.

Now referring to FIG. 6, illustrated is a flow diagram for decision-making process of a positioning module for finding spatial position of a communication device, in accordance with an embodiment of the present disclosure.

At step 602, a list of sensor nodes that have detected the at least one communication device is received.

At step 604, a first sensor node is selected from the received list of sensors.

At step 606, it is checked if the first sensor node has siblings. If the first sensor node has siblings, then at step 608, number of siblings is determined. However, if the first sensor node has no siblings, then step 624 is performed, which is described herein later.

At step 610, it is checked if the first sensor node has more than one sibling. If the first sensor node has more than one sibling, then at step 612, a sensor node tree is loaded. At step 614, the sibling sensor nodes are compared with the list of sensor nodes. At step 616, it is checked that if more than one sibling are present in the list of sensor nodes. If more than one siblings are present in the list of sensor nodes, then at step 618, process for finding the spatial position of the at least one communication device is proceeded. However, if more than one siblings are not present in the list of sensor nodes, then at step 620, observations of the at least one communication device is transmitted to a cache.

If the first sensor node has less than one siblings, then at step 622, it is checked that if bilateration can be enabled. If bilateration can be enabled, then the step 618 is performed. If bilateration cannot be enabled, then the step 620 is performed.

At step 624, it is checked that if monolateration can be enabled. If monolateration can be enabled, then the step 618 is performed, otherwise the step 620 is performed.

Figure 7A:
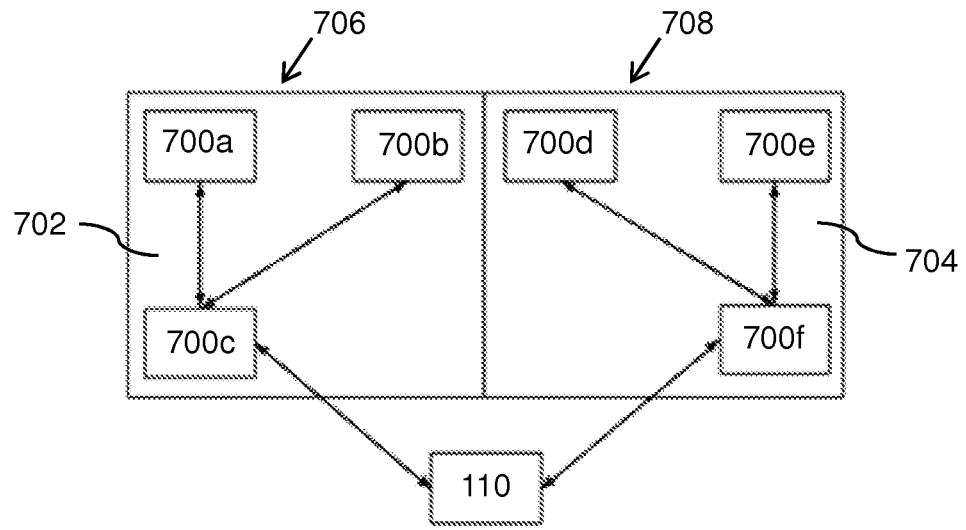
FIGS. 7A-C illustrate example sensor networks formed by a network configuration module, in accordance with an embodiment of the present disclosure.
Figure 7B:
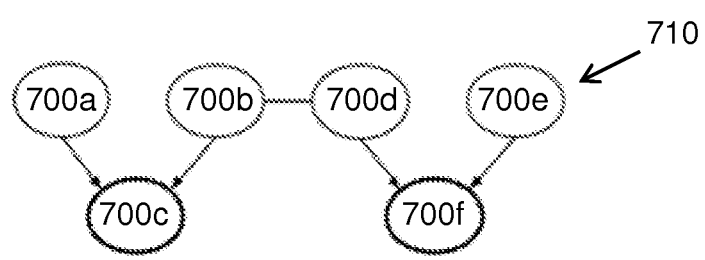
Figure 7C:
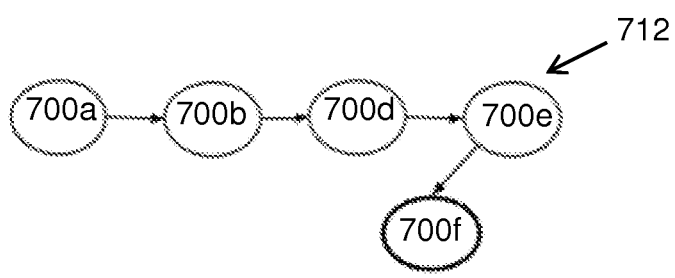

Referring to FIG. 7A-C, illustrated are example sensor networks formed by the network configuration module 126, in accordance with an embodiment of the present disclosure. FIG. 7A illustrates placement of the plurality of sensors, such as the sensors 700a-f, in two zones, such as zones 702 and 704. As shown, the sensors 700a-c placed in the zone 702 forming an ad-hoc network 706 and the sensors 700d-f placed in the zone 704 forming another ad-hoc network 708. Further, arrows between the sensors 700a-f depicts established connections therebetween. The sensors 700c and 700f are the exit points for the two ad-hoc networks 706 and 708 of the zones 702 and 704, respectively.

FIG. 7B illustrates a sensor node graph 710 having the plurality of sensors, such as the sensors 700a-f. As shown, there is a line (without an arrow) between the sensors 700b and 700d denoting that the sensors 700b and 700d can sense each other, however there is no established data connection therebetween. FIG. 7C illustrates a sensor node graph 712 depicting a configuration of a plurality of sensors, when the sensor 700c gets dropped out from the sensor node graph 710 (of FIG. 7B). Specifically, the network configuration module 126 defines the sensor network (shown in FIG. 7C), by removing the sensor 700c, for collecting and forwarding the positioning data.

Figure 8:
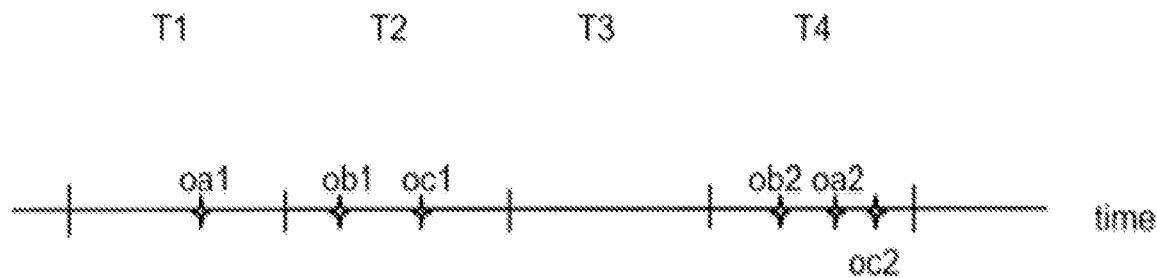
FIG. 8 is an example illustration of positioning data measured by a sensor network over a predetermined time, in accordance with an embodiment of the present disclosure.

Referring now to FIG. 8, illustrated is an example illustration of positioning data measured by a sensor network over a predetermined time, in accordance with an embodiment of the present disclosure. As shown, sensors a, b and c record positioning data for a communication device (not shown here). As shown, the positioning data of the sensors a, b and c are measured with respect to various time-slots, such as time-slots T1, T2, T3 and T4. Further, the sensors a, b and c performs packetization of the positioning data based on such time-slots. Moreover, each packet of the positioning data comprises a plurality of information. The plurality of information includes a time-slot information, sensor identity and number of observations. The sensors a, b and c sends the packets of the positioning data for further processing based on a predetermined-time. Alternatively, the positioning data may be sent based on a status of the communication device, for example, if the communication device is a known effective communication device, then the positioning data recorded by the sensors a, b and c is sent immediately.

As shown, a positioning data oa1 (where, 'o' denotes positioning data (or observation), 'a' denotes the sensor identity and '1' denotes number detections) is received in a time-slot T1. If the positioning data oa1 would have associated with known effective communication device (very important persons' device) such positioning data would have been sent immediately for further processing. Otherwise, the positioning data oa1 would have been sent after the completion of the time-slot T1 (for example in the form of a packet). Further, the positioning module is configured to process the positioning data in a dual manner, based on the pre-determined time and the status of the least one communication device, to determine the spatial position. Similarly, the other positioning data ob1, oc1, oa2, ob2 and oc2, belonging to the time-slots T2, T3 and T4, may be processed.

Figure 9:
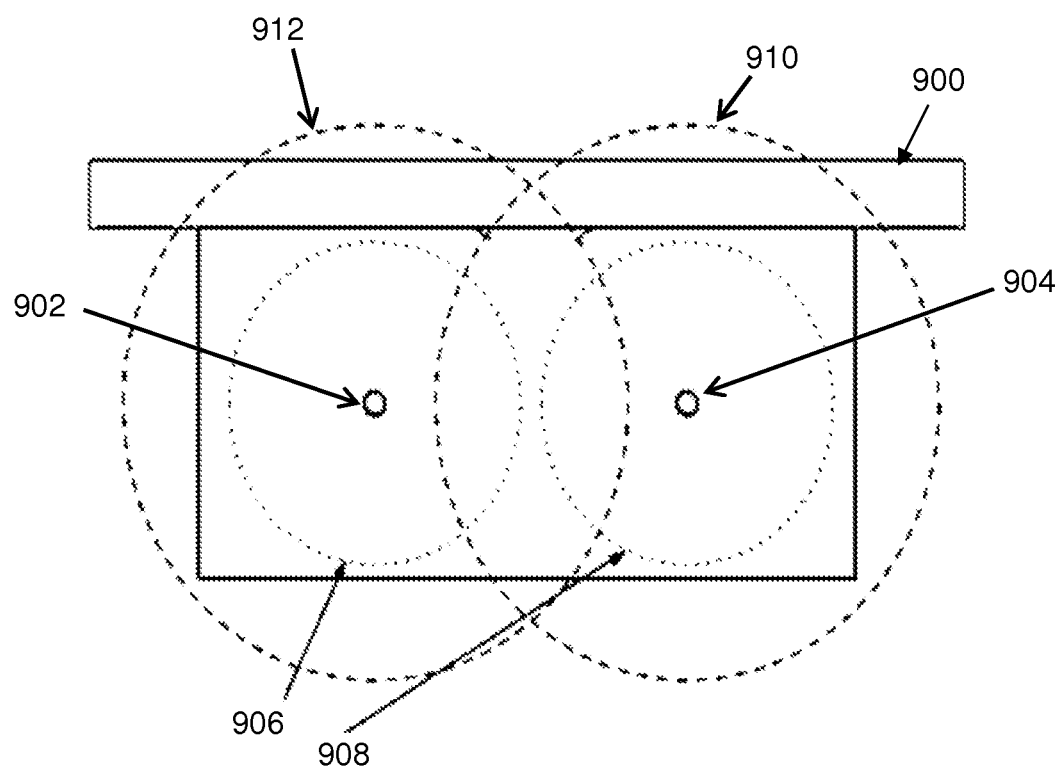
FIG. 9 is an example illustration of a zone arranged with a pair of sensors having a predefined cut-off value, in accordance with an embodiment of the present disclosure.

Referring to FIG. 9, illustrated is an example illustration of a zone 900 arranged with a pair of sensors, such as sensors 902 and 904 having a predefined cut-off value, in accordance with an embodiment of the present disclosure. As shown, the sensors 902 and 904 are surrounded by inner circles 906 and 908 respectively and also outer circles 910 and 912 respectively. The inner circle 906 and 908 represent the predefined cut-off value for reliable detection by the sensors 902 and 904, respectively. The outer circles 910 and 912 represent maximum distance for which the sensors 902 and 904 can hear at least one radio packet transmitted from the at least one communication device and at least one radio packet transmitted between the sensors 902 and 904.

Specifically, the cut-off value means is used for filtering received radio packets with less signal amplitude from a process of managing indoor positioning data of the site 302, and categorized as passers-by. The cut-off value is adjusted for the sensors 902 and 904 to get best coverage for the zone 900. Further, adjustments may be done based on measurements carried out in the calibration process (described in FIG. 3). Further, a secondary cut-off value can be considered for limiting an amount of passers-by to just those that are outside of the zone 900 rather than everyone who is in detection range. This increases the reliability of the passers-by number.

Figure 10:
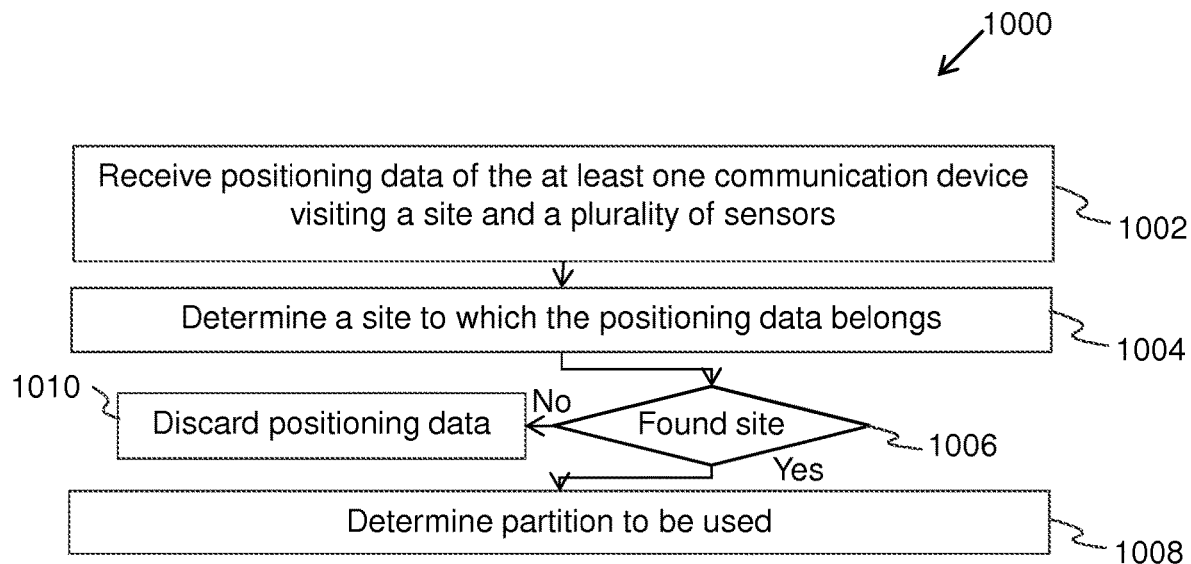
FIG. 10 is a flow diagram for an example method for partitioning positioning data to be processed by a positioning module, in accordance with an embodiment of the present disclosure.

Referring now to FIG. 10, illustrated is a flow diagram 1000 for an example method for partitioning the positioning data to be processed by the positioning module 122, in accordance with an embodiment of the present disclosure.

At step 1002, the positioning data of the at least one communication device visiting a site and the plurality of sensors is received.

At step 1004, the site to which the positioning data belongs is determined by the processing unit 114 (shown in FIG. 1).

At step 1006, it is checked whether the site is found. Specifically, it is checked if information associated with the site is available in the database 116. If the site is found, then at step 1008, a partition to be used is determined; otherwise, at step 1010, the positioning data is discarded.

Figure 11:
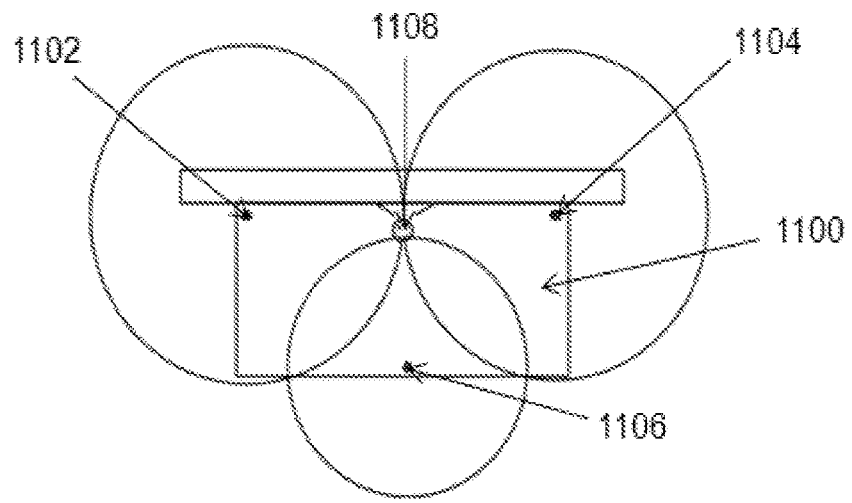
FIG. 11 is an example illustration of a zone arranged with sensors for determining a spatial position of a communication device using a spherical trilateration, in accordance with an embodiment of the present disclosure.

Referring to FIG. 11, illustrated is an example illustration of a zone 1100 arranged with sensors 1102, 1104 and 1106 for determining a spatial position of a communication device 1108 using a spherical trilateration, in accordance with an embodiment of the present disclosure. As shown, the spatial position of the communication device 1108 is determined where spheres corresponding to the sensors 1102, 1104 and 1106 intersect.

Figure 12:
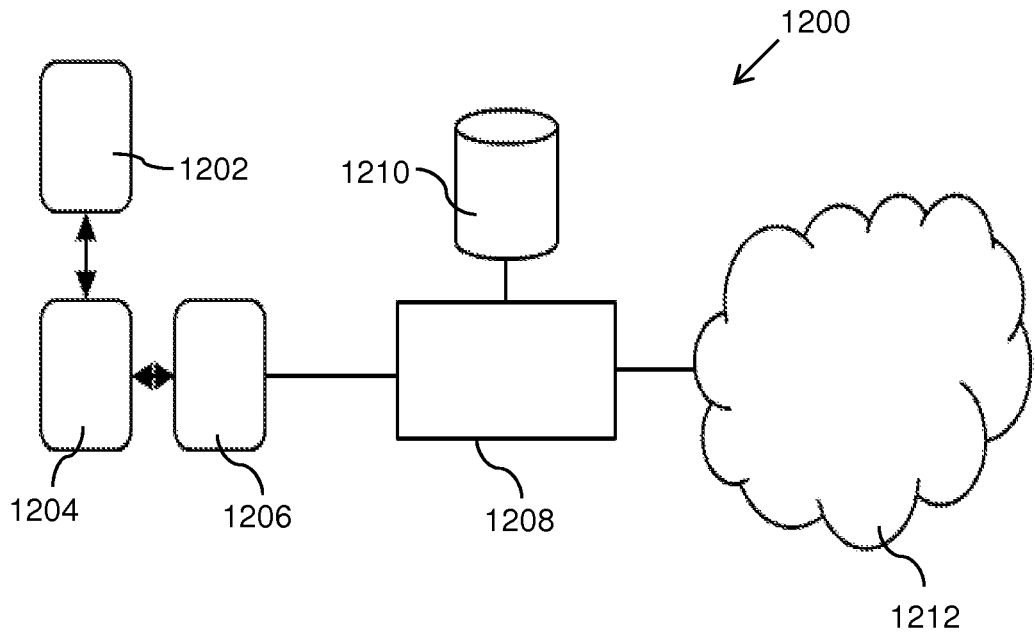
FIG. 12 is a block diagram of an alternative system for managing indoor positioning data of a site having a plurality of zones, in accordance with another embodiment of the present disclosure.

Referring to FIG. 12, illustrated is a block diagram of an alternative system 1200 for managing indoor positioning data of a site having a plurality of zones, in accordance with an embodiment of the present disclosure. The system 1200 comprises a plurality of sensors, such as sensors 1202, 1204 and 1206, a pre-processing unit 1208, a database 1210 communicably coupled to the pre-processing unit 1208 and a cloud service 1212. The sensors 1202, 1204 and 1206 collect positioning data of the at least one communication device visiting the site and the plurality of sensors, such as the sensors 1202, 1204 and 1206, and transmit the positioning data to the pre-processing unit 1208 thereafter. The pre-processing unit 1208 processes the positioning data and converts packeted positioning data into location coordinates (spatial position). This enables in reducing the amount of data transferred.

Further, the database 1210 is configured to store the spatial position of the at least one communication device. This prevents data loss in situations where the connection between the pre-processing unit 1208 and the cloud service 1212 gets broken. Further, the pre-processing unit 1208 buffers and re-organizes the spatial position of the at least one communication device based on the pre-determined time, before sending the data further to the cloud service 1212. The cloud service 1212 processes the received location coordinates and determine aggregated analytics data thereafter.

Figure 13:
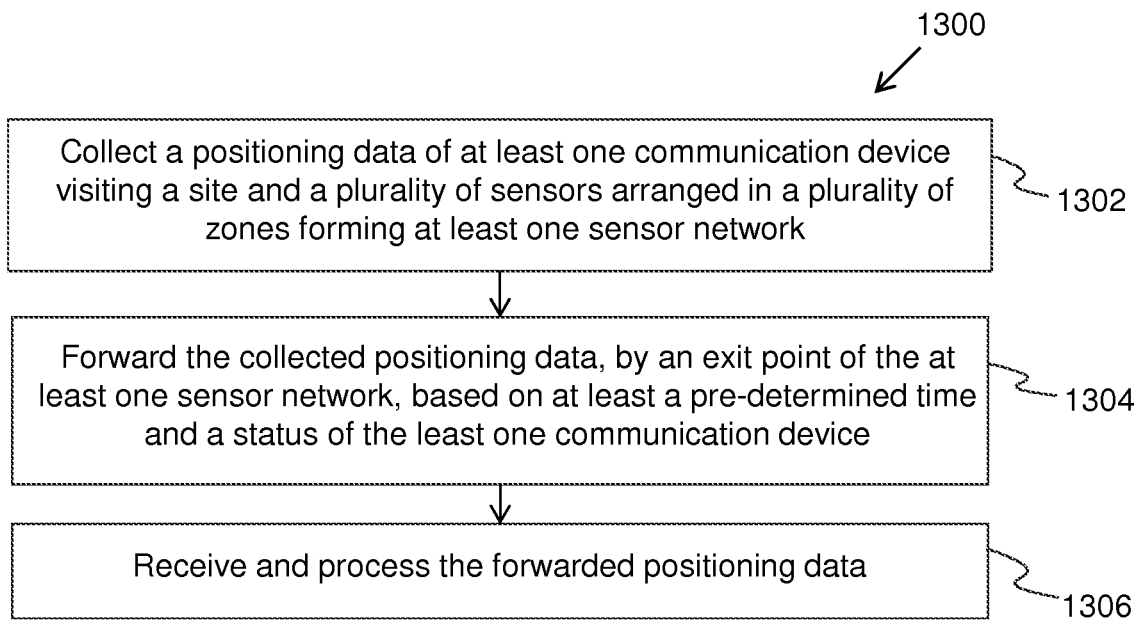
FIG. 13 illustrates steps of a method for managing indoor positioning data of a site having a plurality of zones, in accordance with an embodiment of the present disclosure.

Referring now to FIG. 13, illustrated are steps of a method 1300 for managing indoor positioning data of a site having a plurality of zones, in accordance with an embodiment of the present disclosure. Specifically, those skilled in the art would recognize that the method 1300 is associated with the system 100, explained in conjunction with the FIGS. 1-12.

At step 1302, a positioning data of, at least one communication device visiting the site and a plurality of sensors arranged in the plurality of zones forming at least one sensor network, is collected.

At step 1304, the collected positioning data is forwarded, by an exit point of the at least one sensor network, based on at least a pre-determined time and a status of the least one communication device.

At step 1306, the forwarded positioning data is received by a processing unit for processing the forwarded positioning data. Specifically, the processing unit is operable to determine spatial position of the at least one communication device, by a positioning module of the processing unit, based on the positioning data of the at least one communication device and the plurality of sensors. Further, the processing unit is operable to provide floor-map information of the site, by a site-map module of the processing unit, the site-map module being associated with the positioning module for calibrating installation positions for the plurality of sensors with respect to the plurality of zones. Furthermore, the processing unit is operable to configure the at least one sensor network, by a network configuration module of the processing unit, the network configuration module being associated with the positioning module and the site-map module for identifying sensors that define the at least one sensor network to collect and forward the positioning data. Moreover, the processing unit is operable to and determine aggregated analytics data, by an analytics module of the processing unit, based on the determined spatial position of the at least one communication device.

Further, the steps 1302 to 1306 are only illustrative and other alternatives can also be provided where one or more steps are added, one or more steps are removed, or one or more steps are provided in a different sequence without departing from the scope of the claims herein. In an example, the positioning data for the method 1300 comprises at least one of radio signal strength corresponding to at least one radio packet transmitted from at least one communication device to the plurality of sensors, radio signal strength corresponding to at least one radio packet transmitted between the plurality of sensors, a sensor identity, a communication device identity, a site identity and a zone identity. Further, the pre-determined time for forwarding the collected positioning data comprises positioning data, in a synchronized packet format, collected by the at least one sensor network over a specific time period. The status of the at least one communication device comprises a known communication device and an unknown communication device. The known communication device further comprises an effective communication device and an ineffective communication device. The method 1300 comprises categorizing the unknown communication device into the effective communication device and the ineffective communication device. The at least one communication device is at least one of a Wi-Fi enabled device and a Bluetooth enabled device. In the method 1300, the configuration of the at least one sensor network by the network configuration module comprises at least addition and deletion of a sensor from a sensor network to define the at least one sensor network. Further, the processing unit is operable to select advertisement, by an advertising module, to be displayed in the plurality of zones based on the aggregated analytics data of the at least one communication device. The aggregated analytics data comprises at least one of a visiting path, a visit frequency, a visited zone, a dwell time and a visiting time of the at least one communication device.

The method 1300 further comprises displaying the selected advertisement by a plurality of digital signages arranged in the plurality of zones. The method 1300 also comprises storing, at least the aggregated analytics data determined by the analytics module and the advertisement to be selected by the advertising module, by at least one database. The method 1300 further comprises transcoding the positioning data collected from the at least one sensor network, by a pre-processing module, for providing uniform positioning data to the processing unit. In the method 1300, the processing unit is further operable to store and retrieve the collected positioning data and the determined spatial position by a caching module. Also, the processing unit is operable to partition the positioning data, by a partition module, to be processed by the positioning module to determine the spatial position of the at least one communication device. The partition module is operable to partition the positioning data, based on the zone identity, between a plurality of processing nodes of the positioning module. The method 1300 further comprises maintaining positioning data associated with the plurality of sensors, by a memory graph of the positioning module, the memory graph enables the positioning module to identify and consider missing positioning data, associated with a sensor excluded from the at least one sensor network, while determining the spatial position of the at least one communication device. The method 1300 further comprises processing the positioning data in a dual manner by the positioning module, based on the pre-determined time and the status of the least one communication device, to determine the spatial position.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for managing indoor positioning data of a site having a plurality of zones, the system comprising:
   a plurality of sensors arranged in the plurality of zones for forming at least one sensor network, the at least one sensor network being operable to collect positioning data of at least one communication device present at the site and the plurality of sensors, wherein the at least one sensor network comprises an exit point for forwarding the collected positioning data based on at least a pre-determined time and a status of the at least one communication device; and a processing unit operative to receive the forwarded positioning data from the at least one sensor network, the processing unit comprising at least the following software modules:

a positioning module operative to determine a spatial position of the at least one communication device based on the positioning data of the at least one communication device and the plurality of sensors;

a site-map module operative to depict both floor-map information representing the physical layout of the site and the placement of the plurality of sensors relative to the floor-map information, the site-map module associated with the positioning module and operative to calibrate installation positions for the plurality of sensors with respect to the plurality of zones by conducting one or more probe recording sessions for collecting, in conjunction with the a communication device of a calibrator located at the physical space represented by the floor-map information, one or more radio packets from the communication device of the installer calibrator and one or more of the plurality of sensors, and to measure and analyze radio signal strength corresponding to the one or more radio packets to find spatial positions of the communication device of the calibrator and of one or more of the plurality of sensors, and to associate the measured radio signal strength corresponding to each of the one or more radio packets with the floor-map information of the site so as to identify signal reception capabilities of the plurality of sensors;

a network configuration module operative to configure the at least one sensor network to collect and forward the positioning data, the network configuration module being associated with the positioning module and the site-map module for identifying sensors that define the at least one sensor network; and an analytics module operative to determine aggregated analytics data based on the determined spatial position of the at least one communication device;

wherein the network configuration module is operable to sense if a sensor is dropped out from the sensor network or a new sensor is added to the sensor network for defining the at least one sensor network.

2. The system according to claim 1, wherein the positioning data comprises at least one of radio signal strength corresponding to at least one radio packet transmitted from the at least one communication device to the plurality of sensors, radio signal strength corresponding to at least one radio packet transmitted between the plurality of sensors, a sensor identity, a communication device identity, a site identity and a zone identity.

3. The system according to claim 1, wherein the predetermined time for forwarding the collected positioning data comprises positioning data, in a synchronized packet format, collected by the at least one sensor network over a specific time period.

4. The system according to claim 1, wherein the status of the at least one communication device is one of a known communication device and an unknown communication device.

5. The system according to claim 4, wherein the known communication device is further categorized as one of an effective communication device and an ineffective communication device.

6. The system according to claim 4, wherein the unknown communication device is further categorized into one of an effective communication device and an ineffective communication device.

7. The system according to claim 1, wherein the at least one communication device is at least one of a Wi-Fi enabled device and a Bluetooth enabled device.

8. The system according to claim 1:

wherein the processing unit software modules further comprise an advertising module operative to select at least one advertisement to be displayed in the plurality of zones based on the aggregated analytics data of the at least one communication device; and further comprising a plurality of digital signages arranged in the plurality of zones for displaying the selected advertisement.

9. The system according to claim 1, further comprising a pre-processing software module for transcoding the positioning data collected from the at least one sensor network for providing uniform positioning data to the processing unit.

10. The system according to claim 1, wherein the processing unit software modules further comprise a caching module operative to store and retrieve the collected positioning data and the determined spatial position.

11. The system according to claim 1, wherein the processing unit software modules further comprise a partition module operative to partition the positioning data to be processed by the positioning module to determine the spatial position of the at least one communication device.

12. The system according to claim 11, wherein the partition module is operable to partition the positioning data, based on the zone identity, between a plurality of processing nodes of the positioning module.

13. A system for managing indoor positioning data of a site having a plurality of zones, the system comprising:

a plurality of sensors arranged in the plurality of zones for forming at least one sensor network, the at least one sensor network being operable to collect positioning data of at least one communication device present at the site and the plurality of sensors, wherein the at least one sensor network comprises an exit point for forwarding the collected positioning data based on at least a pre-determined time and a status of the at least one communication device;

a processing unit operative to receive the forwarded positioning data from the at least one sensor network, the processing unit comprising at least the following software modules:

a positioning module operative to determine a spatial position of the at least one communication device based on the positioning data of the at least one communication device and the plurality of sensors;

a site-map module operative to depict both floor-map information representing the physical layout of the site and the placement of the plurality of sensors relative to the floor-map information, the site-map module associated with the positioning module and operative to calibrate installation positions for the plurality of sensors with respect to the plurality of zones by conducting one or more probe recording sessions for collecting, in conjunction with the a communication device of a calibrator located at the physical space represented by the floor-map information, one or more radio packets from the communication device of the installer calibrator and one or more of the plurality of sensors, and to measure and analyze radio signal strength corresponding to the one or more radio packets to find spatial positions of the communication device of the calibrator and of one or more of the plurality of sensors, and to associate the measured radio signal strength corresponding to each of the one or more radio packets with the floor-map information of the site so as to identify signal reception capabilities of the plurality of sensors;
- a network configuration module operative to configure the at least one sensor network to collect and forward the positioning data, the network configuration module being associated with the positioning module and the site-map module for identifying sensors that define the at least one sensor network;
- an analytics module operative to determine aggregated analytics data based on the determined spatial position of the at least one communication device; and
- an advertising module operative to select at least one advertisement to be displayed in the plurality of zones based on the aggregated analytics data of the at least one communication device;
- a plurality of digital signages arranged in the plurality of zones for displaying the selected advertisement.

14. The system according to claim 13, wherein the network configuration module is operable to sense if a sensor is dropped out from the sensor network or a new sensor is added to the sensor network for defining the at least one sensor network.

15. The system according to claim 13, wherein the aggregated analytics data comprises at least one of a visiting path, a visit frequency, a visited zone, a dwell time and a visiting time of the at least one communication device.

16. The system according to claim 13, further comprising at least one database for storing at least the aggregated analytics data determined by the analytics module and advertisement content to be selected by the advertising module.

17. A system for managing indoor positioning data of a site having a plurality of zones, the system comprising:
- a plurality of sensors arranged in the plurality of zones for forming at least one sensor network, the at least one sensor network being operable to collect positioning data of at least one communication device present at the site and the plurality of sensors, wherein the at least one sensor network comprises an exit point for forwarding the collected positioning data based on at least a pre-determined time and a status of the at least one communication device;
- a processing unit operative to receive the forwarded positioning data from the at least one sensor network, the processing unit comprising at least the following software modules:
  - a positioning module operative to determine a spatial position of the at least one communication device based on the positioning data of the at least one communication device and the plurality of sensors;
  - a site-map module operative to depict both floor-map information representing the physical layout of the site and the placement of the plurality of sensors relative to the floor-map information, the site-map module associated with the positioning module and operative to calibrate installation positions for the plurality of sensors with respect to the plurality of zones by conducting one or more probe recording sessions for collecting, in conjunction with the a communication device of a calibrator located at the physical space represented by the floor-map information, one or more radio packets from the communication device of the installer calibrator and one or more of the plurality of sensors, and to measure and analyze radio signal strength corresponding to the one or more radio packets to find spatial positions of the communication device of the calibrator and of one or more of the plurality of sensors, and to associate the measured radio signal strength corresponding to each of the one or more radio packets with the floor-map information of the site so as to identify signal reception capabilities of the plurality of sensors;
  - a network configuration module operative to configure the at least one sensor network to collect and forward the positioning data, the network configuration module being associated with the positioning module and the site-map module for identifying sensors that define the at least one sensor network; and
  - an analytics module operative to determine aggregated analytics data based on the determined spatial position of the at least one communication device;
- wherein the positioning module comprises a memory graph operative to maintain positioning data associated with the plurality of sensors, and wherein further the memory graph enables the positioning module to identify and consider missing positioning data, associated with a sensor excluded from the at least one sensor network, while determining the spatial position of the at least one communication device.

18. The system according to claim 17, wherein the positioning module is configured to process the positioning data in a dual manner, based on the pre-determined time and the status of the least one communication device, to determine the spatial position.

19. A method for managing indoor positioning data of a site having a plurality of zones, the method comprising:
- collecting positioning data of at least one communication device present at the site and a plurality of sensors arranged in the plurality of zones forming at least one sensor network;
- forwarding the collected positioning data, by an exit point of the at least one sensor network, based on at least a pre-determined time and a status of the least one communication device;
- receiving the forwarded positioning data by a processing unit for processing the forwarded positioning data, the processing unit comprising a plurality of software modules, wherein the processing unit is operable to:
  - determine spatial position of the at least one communication device, by a positioning module of the processing unit, based on the positioning data of the at least one communication device and the plurality of sensors;
  - depict floor-map information representing the physical layout of the site and the placement of the plurality of sensors relative to the floor-map information, by a site-map module of the processing unit, the site-map module being associated with the positioning module and operative to calibrate installation positions for the plurality of sensors with respect to the plurality of zones;

calibrate installation positions for the plurality of sensors with respect to the plurality of zones by conducting one or more probe recording sessions for collecting, in conjunction with a communication device of a calibrator located at the physical space represented by the floor-map information, one or more radio packets from the communication device of the calibrator and one or more of the plurality of sensors, and to measure and analyze radio signal strength corresponding to the one or more radio packets to find spatial positions of the communication device of the calibrator and of one or more of the plurality of sensors, and to associate the measured radio signal strength corresponding to each of the one or more radio packets with the floor-map information of the site so as to identify signal reception capabilities of the plurality of sensors;

configure the at least one sensor network, by a network configuration module of the processing unit, to collect and forward the positioning data, the network configuration module being associated with the positioning module and the site-map module for identifying sensors that define the at least one sensor network; and determine aggregated analytics data, by an analytics module of the processing unit, based on the determined spatial position of the at least one communication device;

wherein the configuration of the at least one sensor network by the network configuration module comprises sensing if a sensor is dropped out from a sensor network or a new sensor is added to the sensor network for defining the at least one sensor network.

20. The method according to claim 19, wherein the positioning data comprises at least one of radio signal strength corresponding to at least one radio packet transmitted from the at least one communication device to the plurality of sensors, radio signal strength corresponding to at least one radio packet transmitted between the plurality of sensors, a sensor identity, a communication device identity, a site identity and a zone identity.

21. The method according to claim 19, wherein the pre determined time for forwarding the collected positioning data comprises positioning data, in a synchronized packet format, collected by the at least one sensor network over a specific time period.

22. The method according to claim 19, wherein the status of the at least one communication device is one of a known communication device and an unknown communication device.

23. The method according to claim 22, wherein the known communication device is further categorized as one of an effective communication device and an Ineffective communication device.

24. The method according to claim 22, further comprising categorizing the unknown communication device as one of an effective communication device and an ineffective communication device.

25. The method according to claim 19, wherein the at least one communication device is at least one of a Wi-Fi enabled device or a Bluetooth enabled device.

26. The method according to claim 19:
wherein the processing unit software modules further comprise an advertising module, and wherein the processing unit is further operable to select at least one advertisement, by the advertising module, to be displayed in the plurality of zones based on the aggregated analytics data of the at least one communication device; and the method further comprising displaying the selected advertisement by a plurality of digital signages arranged in the plurality of zones.

27. The method according to claim 19, wherein the processing unit software modules further comprise a pre-processing module, and the method further comprising transcoding the positioning data collected from the at least one sensor network, by the pre-processing module, for providing uniform positioning data to the processing unit.

28. The method according to claim 19, wherein the processing unit is further operable to store and retrieve the collected positioning data and the determined spatial position by a caching module.

29. The method according to claim 19, wherein the processing unit software modules further comprise a partition module, and wherein the processing unit is further operable to partition the positioning data, by the partition module, to be processed by the positioning module to determine the spatial position of the at least one communication device.

30. The method according to claim 29, wherein the partition module is operable to partition the positioning data, based on the zone identity, between a plurality of processing nodes of the positioning module.

31. The method according to claim 19, further comprising processing the positioning data in a dual manner by the positioning module, based on the pre-determined time and the status of the least one communication device, to determine the spatial position.

32. A method for managing indoor positioning data of a site having a plurality of zones, the method comprising:

collecting positioning data of at least one communication device present at the site and a plurality of sensors arranged in the plurality of zones forming at least one sensor network;

forwarding the collected positioning data, by an exit point of the at least one sensor network, based on at least a pre-determined time and a status of the least one communication device;

receiving the forwarded positioning data by a processing unit for processing the forwarded positioning data, the processing unit comprising a plurality of software modules, wherein the processing unit is operable to:

determine spatial position of the at least one communication device, by a positioning module of the processing unit, based on the positioning data of the at least one communication device and the plurality of sensors;

depict floor-map information representing the physical layout of the site and the placement of the plurality of sensors relative to the floor-map information, by a site-map module of the processing unit, the site-map module being associated with the positioning module and operative to calibrate installation positions for the plurality of sensors with respect to the plurality of zones;

calibrate installation positions for the plurality of sensors with respect to the plurality of zones by conducting one or more probe recording sessions for collecting, in conjunction with a communication device of a calibrator located at the physical space represented by the floor-map information, one or more radio packets from the communication device of the calibrator and one or more of the plurality of sensors, and to measure and analyze radio signal strength corresponding to the one or more radio packets to find spatial positions of the communication device of the calibrator and of one or more of the plurality of sensors, and to associate the measured radio signal strength corresponding to each of the one or more radio packets with the floor-map information of the site so as to identify signal reception capabilities of the plurality of sensors;

configure the at least one sensor network, by a network configuration module of the processing unit, to collect and forward the positioning data, the network configuration module being associated with the positioning module and the site-map module for identifying sensors that define the at least one sensor network;

determine aggregated analytics data, by an analytics module of the processing unit, based on the determined spatial position of the at least one communication device; and select at least one advertisement, by an advertising module, to be displayed in the plurality of zones based on the aggregated analytics data of the at least one communication device;

displaying the selected advertisement by a plurality of digital signages arranged in the plurality of zones.

33. The method according to claim 32, wherein the configuration of the at least one sensor network by the network configuration module comprises sensing if a sensor is dropped out from a sensor network or a new sensor is added to the sensor network for defining the at least one sensor network.

34. The method according to claim 32, wherein the aggregated analytics data comprises at least one of a visiting path, a visit frequency, a visited zone, a dwell time and a visiting time of the at least one communication device.

35. The method according to claim 32, further comprising storing at least the aggregated analytics data determined by the analytics module and the advertisement to be selected by the advertising module by at least one database.

36. A method for managing indoor positioning data of a site having a plurality of zones, the method comprising:

collecting positioning data of at least one communication device present at the site and a plurality of sensors arranged in the plurality of zones forming at least one sensor network;

forwarding the collected positioning data, by an exit point of the at least one sensor network, based on at least a pre-determined time and a status of the least one communication device;

receiving the forwarded positioning data by a processing unit for processing the forwarded positioning data, the processing unit comprising a plurality of software modules, wherein the processing unit is operable to:

determine spatial position of the at least one communication device, by a positioning module of the processing unit, based on the positioning data of the at least one communication device and the plurality of sensors;

depict floor-map information representing the physical layout of the site and the placement of the plurality of sensors relative to the floor-map information, by a site-map module of the processing unit, the site-map module being associated with the positioning module and operative to calibrate installation positions for the plurality of sensors with respect to the plurality of zones;

calibrate installation positions for the plurality of sensors with respect to the plurality of zones by conducting one or more probe recording sessions for collecting, in conjunction with a communication device of a calibrator located at the physical space represented by the floor-map information, one or more radio packets from the communication device of the calibrator and one or more of the plurality of sensors, and to measure and analyze radio signal strength corresponding to the one or more radio packets to find spatial positions of the communication device of the calibrator and of one or more of the plurality of sensors, and to associate the measured radio signal strength corresponding to each of the one or more radio packets with the floor-map information of the site so as to identify signal reception capabilities of the plurality of sensors;

configure the at least one sensor network, by a network configuration module of the processing unit, to collect and forward the positioning data, the network configuration module being associated with the positioning module and the site-map module for identifying sensors that define the at least one sensor network; and determine aggregated analytics data, by an analytics module of the processing unit, based on the determined spatial position of the at least one communication device;

maintaining positioning data associated with the plurality of sensors, by a memory graph of the positioning module, wherein the memory graph enables the positioning module to identify and consider missing positioning data, associated with a sensor excluded from the at least one sensor network, while determining the spatial position of the at least one communication device.

* * * * *